United States Patent [19]
Koluch et al.

[11] 3,727,756
[45] Apr. 17, 1973

[54] ARTICLE SUPPLY SYSTEM

[75] Inventors: Joseph S. Koluch, Toledo; Ralph E. Wittman, Maumee, both of Ohio

[73] Assignee: Owens-Illinois, Inc., Toledo, Ohio

[22] Filed: May 27, 1971

[21] Appl. No.: 147,441

[52] U.S. Cl. ........................209/73, 209/74, 221/68, 221/106, 221/175, 221/11, 214/16 B, 156/566
[51] Int. Cl. ...............................................B07c 5/38
[58] Field of Search......................209/71, 72, 73, 74; 198/75; 221/104, 106, 175, 10, 9, 11, 12, 68, 103; 214/16 B; 156/566

[56] References Cited

UNITED STATES PATENTS

| | | | |
|---|---|---|---|
| 3,342,350 | 9/1967 | Seragnoli | 214/16 B |
| 3,367,534 | 2/1968 | Carter | 221/68 |
| 3,339,700 | 9/1967 | Wells | 209/72 X |

Primary Examiner—Allen N. Knowles
Attorney—J. R. Nelson and E. J. Holler

[57] ABSTRACT

An article supply system for supplying articles on demand to a production line at which the demand for the articles may be variable or irregular. The system is specifically designed for the production line assembly of composite articles in which two components of the article are continuously manufactured at independently variable rates and fed through separate lines which merge with each other at an assembly station. The system includes a bank of individual storage cells operable to receive, store and discharge in an oriented position like units constituting one component of the composite article. A supply accumulator cell is located upstream of the storage cells to continuously receive the units as they are manufactured and to intermittently transfer the units to selected ones of the storage cells. A demand accumulator is located between the storage cells and the assembly station to continuously supply units to the assembly station in accordance with the demand rate at which the second components of the article are fed to the assembly station. The demand accumulator is supplied with units from the storage cells to maintain an adequate supply of bases within the demand accumulator at all times. Selection of the individual storage cells to be loaded or unloaded is under the control of a computer which maintains an inventory of the status of the various cells at all times. An inspection system also operates through the computer to prevent substandard articles from being transferred to the assembly station.

34 Claims, 32 Drawing Figures

INVENTORS
JOSEPH S. KOWCH
RALPH E. WITTMAN
BY
J. R. Nelson
& E. J. Holler
ATTORNEYS INVENTORS
JOSEPH S KOLUCH
RALPH E WITTMAN
BY J R Nelson
ATTORNEYS

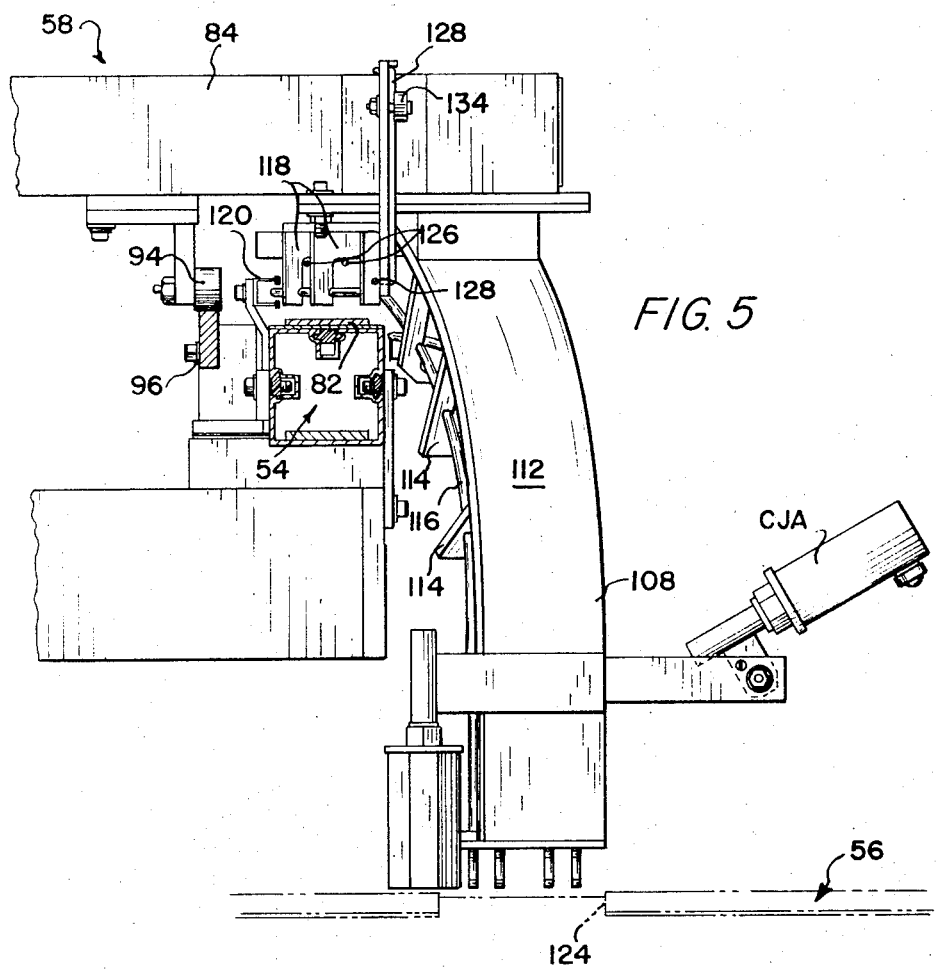
FIG. 5
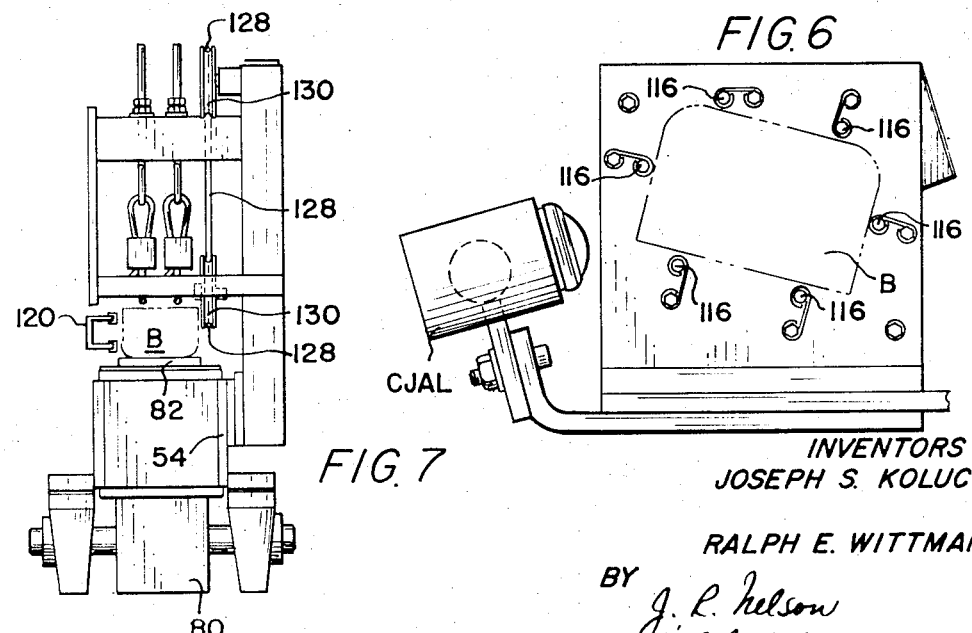
FIG. 6
FIG. 7
INVENTORS
JOSEPH S. KOLUCH
RALPH E. WITTMAN
BY J. R. Nelson
   E. J. Waller
ATTORNEYS

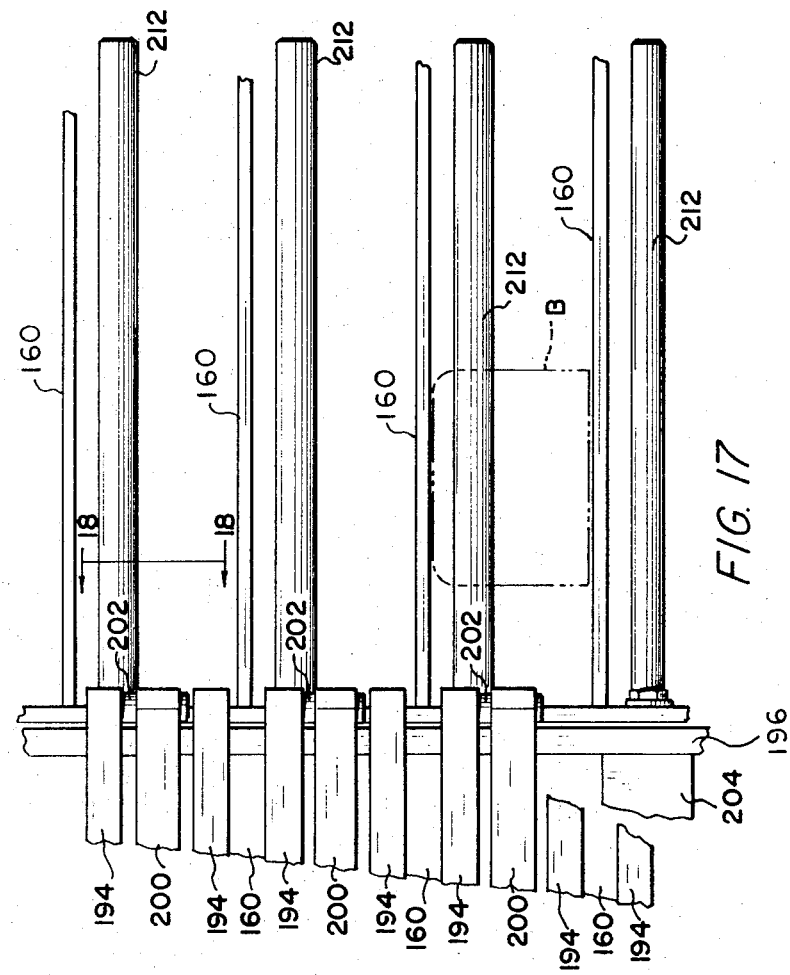
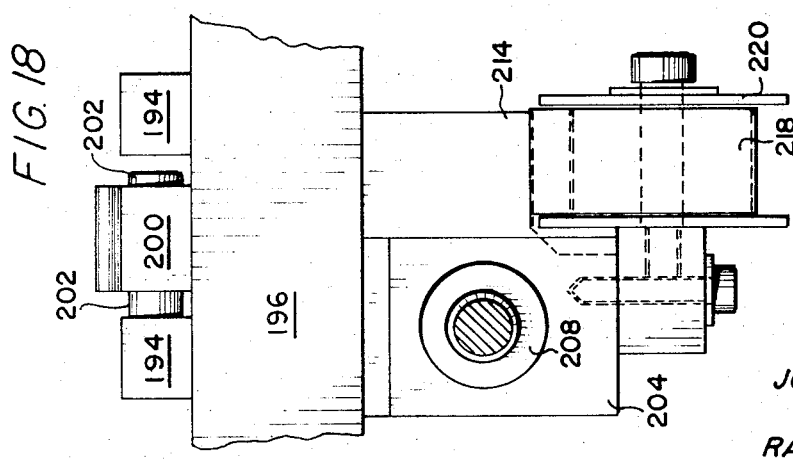

INVENTORS
JOSEPH S. KOLUCH
RALPH E. WITTMAN
BY J. R. Nelson
E. J. Holler
ATTORNEYS

ARTICLE SUPPLY SYSTEM

RELATED PATENTS AND APPLICATIONS

The system of the present application, although capable of use in other environments, was specifically designed to supply the plastic base elements of the composite container of U.S. Pat. No. 3,372,826 to an assembly machine which is the subject matter of a commonly owned copending application of James D. Mallory et al., Ser. No. 883,515, filed Dec. 9, 1969, now U.S. Pat. No. 3,630,797. The assembly machine of application Ser. No. 883,515 assembles the plastic base component of U.S. Pat. No. 3,372,826 upon the bottom of the bulb shaped glass container component of the composite container. The glass component of a composite container is manufactured and fed to the assembly machine by a glass production line which forms the subject matter of another commonly owned copending application of Richard A. Heaton et al., Ser. No. 24,721 filed April 1, 1970.

BACKGROUND OF THE INVENTION

The system of the present invention was developed to enable the production of composite containers of the type shown in U.S. Pat. No. 3,372,826 in a continuous integrated process in which raw materials are fed in at one end of the line and a completed product is continuously discharged at the opposite end of the line. Because the composite container of U.S. Pat. No. 3,372,826 is assembled from a glass container component and a cylindrical cup shaped plastic base component, the two components must be separately formed by different machinery and techniques which make it difficult to the point of impracticability to achieve precisely matched production rates of the two separate components. As explained in detail in the aforementioned application Ser. No. 24,271, the glass components are formed and treated while continuously moving along a production line at a constant or substantially constant rate of speed. The plastic base elements, on the other hand, are produced by injection molding machines. Thus, while the production rate of the glass container components is at an infinitely variable rate, adjustment of the production rate of the plastic base components is on a step by step basis. An additional problem presented by the glass line is the fact that although the line may run continuously, minor maladjustments in any of the forming or treating equipment may result in the production of substandard glass containers which are ejected from the glass line before they reach the assembly station. This can create gaps of random length in the line of glass containers moving to the assembly station, thus making it impractical to supply bases to the assembly station at a rate matching the rate of movement of the glass line.

Further, because the glass and plastic components are produced on separate production lines which merge at the assembly station, a malfunction requiring the shutting down of one line does not interfere with production on the other line.

The characteristics of the glass line are such that once production is commenced the glass line will run continuously until it is shut down either by a major malfunction or a temporary termination of production. In the event of a temporary interruption of the base supply, it is more economical to maintain the glass line in operation and to continuously reject all glass containers from the line at a point upstream from the assembly station. The rejected containers are recycled through the glass furnace as cullet, hence only production time is lost.

With the foregoing requirements in mind, the system by means of which bases are supplied to the assembly station includes a storage system which can accumulate a substantial supply of bases to enable continued operation of the base production system during temporary periods of malfunction in the glass line and to accumulate a supply of bases to be supplied to the glass line during periods of temporary shutdown of the base production system. The assembly station at which the base elements are married to the glass component is so designed that the bases are physically removed from the base supply line by the passage of the glass container, thus creating a demand consumption of the bases which automatically compensates for variations in rate of movement of the glass line and for gaps in the glass line occasioned by rejection of glass containers upstream from the assembly station.

SUMMARY OF THE INVENTION

The heart of the storage system of the present invention takes the form of a bank of storage cells, each of which is so dimensioned as to contain an approximate three minute supply of bases for the glass line stacked in an oriented position in a single vertically disposed layer. Loading and unloading conveyors are mounted to extend the entire length of the bank of cells at locations respectively above and below the cells. Bases are diverted from the upper loading conveyor into a selected cell by means of a loading carriage positioned in operative alignment with the selected cell and having a base deflecting chute operable to deflect bases from the loading conveyor into an inlet opening of the cell. Bases being loaded fall freely into the cell and are maintained in orientation by virtue of the fact that the width of the cell closely approximates the axial dimension of the base, thus preventing the base from turning within the cell. The system is so controlled that each cell is completely filled with bases, at which time the flow of bases onto the loading conveyor is stopped, by actuation of a gate, and the loading carriage is shifted into alignment with a new empty cell which is selected by a computer control system. When the loading carriage is in operative alignment with the new cell, the gate is opened to permit bases to flow onto the conveyor, and, via the loading carriage chute into the new cell.

Unloading of the bases is similarly accomplished by means of an unloading carriage movable beneath the cells into position in operative alignment with a selected cell. Each cell has a base outlet opening which is normally closed by a gate which is opened by mechanism carried by the unloading carriage. The size of the outlet opening is selected such that bridging of the bases at the discharge opening is practically eliminated. Upon opening of the cell gate, bases flow by gravity through the outlet opening and onto the unloading conveyor. Flipper bars at opposite sides of the cell discharge opening are raised to an inclined position to assist in gravitationally discharging the last group of bases from the cell. The flipper bars are likewise actuated by mechanism carried by the unloading carriage.

A supply accumulator is located in the base supply line upstream from the storage cells to provide for the accumulation of bases during those periods when the gate at the entrance of the loading conveyor is closed, as during movement of the loading carriage between successive cells.

A demand accumulator is located between the storage cells and the assembly station, from which bases are withdrawn on demand of the glass line. The demand accumulator is equipped with three level sensing switches to control the flow of bases from the storage cells to the demand accumulator in response to the number of bases contained in the demand accumulator at a given time. The upper most level sensing switch, when the level of bases in the demand accumulator rises to its level will terminate further unloading of the storage cells. When the level of bases in the demand accumulator falls to the level sensing switch at the uppermost location, unloading of the cells is initiated with the unloading conveyor running at a low speed. When the level of the bases in the demand accumulator falls to the level sensing switch at the intermediate location, the unloading conveyor is shifted to deliver bases to the demand accumulator at the standard speed. Should the level of bases within the demand accumulator fall to the location of the lower most level sensing switch, the unloading conveyor is shifted to deliver bases to the demand accumulator at a higher speed.

An inspection system is incorporated with the inspection being performed at the outlet side of a decorator which applies a label or decoration to the plastic base elements at a location substantially upstream from the supply accumulator. The nature of the inspection performed is such that it must be performed manually at periodic intervals. The control system is such that upon the detection of a substandard label, any bases which have been fed into the cells since the last previous satisfactory inspection are held against discharge from the cells, a computer being linked to the inspection system to retain in its memory bank an inventory of those cells into which bases with substandard labels have been loaded.

The entire system is designed to handle the bases, from their initial formation to the assembly on the glass container units, in a positively maintained orientation at all times.

Other features and advantages of the invention will become apparent by reference to the following specification and drawings.

IN THE DRAWINGS

FIG. 1b is a side elevational view, partially broken away, showing an assembled composite container which includes the base element of FIG. 1a;

FIG. 5 is a detail front view showing the cell loading chute of the loading carriage;

FIG. 6 is a bottom plan view showing the outlet end of the cell loading chute;

FIG. 7 is a detail end view of one of the two loading conveyors;

FIG. 17 is a detail top plan view showing a portion of the outlet gates of the storage cells;

FIG. 18 is a detail cross sectional view taken approximately on line 18—18 of FIG. 17;

GENERAL DESCRIPTION

Although, as will become apparent from the following specification, the storage system of the present application may be employed in other environments, it is described below in terms of its application to the supplying of plastic base elements to a production line for assembly with a glass container component to form a composite container of the type disclosed in U.S. Pat. No. 3,372,826.

Figure 1:
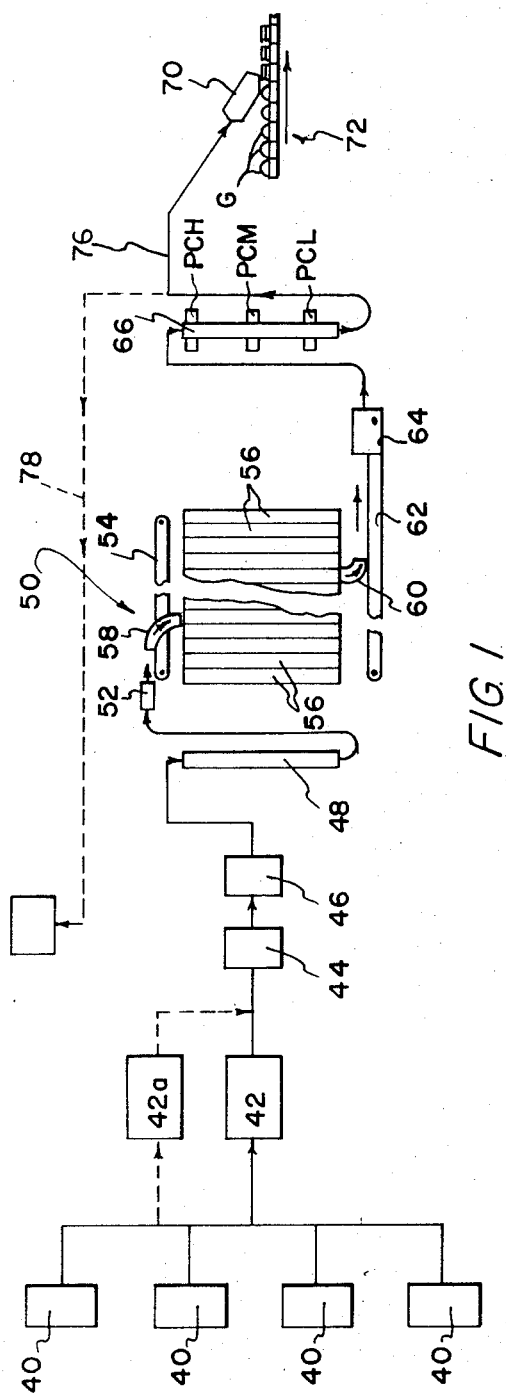
FIG. 1 is a schematic diagram of an article handling and storage system embodying the present invention.
Figure 1B:
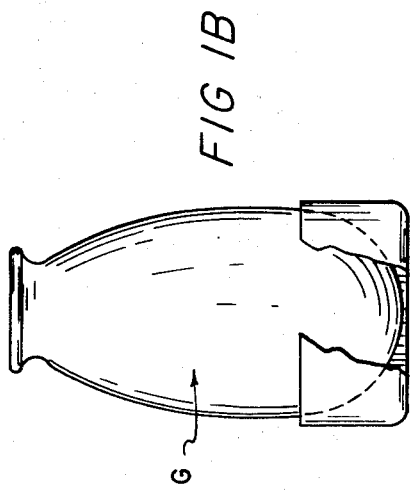
Figure 1A:
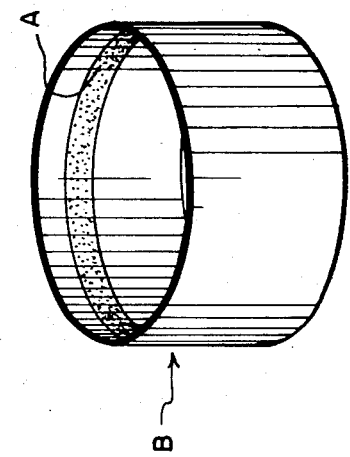
FIG. 1a is a schematic diagram of a cup shaped plastic element handled by the system of FIG. 1.

Referring first to FIG. 1a, the plastic base elements which are handled by the present storage system take the form of a cylindrical cup shaped base element B of relatively thin walled construction. The base element B is suitably dimensioned to receive and be bonded to a bulb shaped glass container component G to provide stable support for the glass component. Bonding is accomplished by applying an annular band of hot melt adhesive A to the interior of base element B. As indicated in FIG. 1a, a label or decoration is applied to the plastic base element B to identify the source and product which is to be bottled in the completed composite container.

The glass container components G are manufactured on a glass line described in detail in a commonly owned copending application of Richard A. Heaton et al., Ser. No. 24,721, filed April 1, 1970. As described in detail in application Ser. No. 24,721, the glass line is operable to produce glass container components G at rates of up to 600 or more container components per minute. The glass components G are formed and fed through the glass line uniformly spaced in single line and ultimately reach an assembly machine at which the plastic base elements B are assembled upon the glass container component G (see FIG. 24). This assembly machine constitutes the subject matter of another commonly owned copending application of James D. Mallory et al. Ser. No. 883,515, filed Dec. 9, 1969, now U.S. Pat. No. 3,630,797. Prior to reaching the assembly machine, the glass container components G are inspected at several stations along the line and substandard containers are ejected from the glass line before they reach the assembly machine. Thus, although the glass line may continue to move at constant speed through the assembly machine, there may be gaps of varying length in the line due to ejected substandard glass components. Thus, while the base supply system must be capable of supplying base elements B to the assembly machine at a rate equal to the maximum rate of production of the glass line, the base supply system must be capable of adapting itself to gaps in the glass line due to containers which have been ejected.

Referring now to FIG. 1, the base supply system embodying the present invention is shown schematically. Plastic base elements B are formed by a plurality of injection molding machines designated schematically at 40. The production rate of an individual forming machine 40 is but a fraction of the maximum production rate of the glass line, hence a plurality of forming machines are employed and the number of forming machines in operation at any given time is selected to approximately match the production rate at which the glass line is being run. Bases produced by the forming machines 40 are extracted from the machines and conveyed single line in an oriented position by a conveying system to a decorating machine 42 which applies a label to the base elements. In FIG. 1, a second decorating machine 42a has been illustrated to indicate that the line may be switched from one label to another without interrupting production.

The bases are conveyed between the various machines by suitable belt and/or pneumatic conveying systems whose details do not form part of the present invention. From decorating machine 42 (or 42a) the decorated bases are fed in single line past an inspection station schematically indicated at 44. An inspector periodically withdraws a base from the line at station 44 and inspects the quality of the applied decoration or label. He indicates the result of his inspection by pressing either a "good" or "bad" button which is coupled into an electric control circuit for purposes which will be described in greater detail below. In brief, the quality of the decoration will deteriorate progressively, as by a gradual change in color of the ink or by blurring of a portion of the decoration and, upon the detection of a substandard decoration, it is desired to prevent all bases which have passed the inspection station since the last satisfactory inspection from being passed on to the assembly line.

From the inspection station 44, the bases are conveyed through an adhesive applicator 46 which applies the annular band of hot melt adhesive A to each base. From adhesive applicator 46, the bases are conveyed to a supply accumulator schematically indicated at 48. Accumulator 48 is simply a box like container dimensioned to receive and store the bases in a single vertically disposed layer, in order to maintain orientation of the bases.

From accumulator 48, the bases are conveyed in two parallel separate single lined paths to a storage cell assembly designated generally 50. Storage cell assembly 50 includes a gate 52 at the end of each of the two paths at the entrance of the cell assembly which may be opened or closed to permit or prevent the flow of bases into assembly 50. When gates 52 are open, bases can pass the gates onto the upper runs of two parallel belt conveyors 54 which extend horizontally above a bank of individual storage cells 56. Bases pass in single line on each conveyor 54 from left to right along the upper run of conveyors 54 as viewed in FIG. 1. Bases are diverted from the belts into a selected one of storage cells 56 by a loading carriage designated generally 58 which is positioned in operative alignment with a selected cell 56 to be filled by a control system described in greater detail below. The control system is designed in a manner such that the loading carriage 58 can be positioned in operative alignment only with a cell which is completely empty and will feed bases to the cell until the cell is completely filled. Upon the filling of an empty cell, the control system is automatically actuated to shift loading carriage 58 into operative alignment with another empty cell.

As will be described in greater detail, cells 56 are defined by a pair of parallel vertically disposed partitions which are spaced from each other by a distance only slightly greater than the axial dimension of a base B. A single partition forms a common wall of two adjacent cells, the cells being provided with side walls and upper and lower walls to enclose a chamber which is so dimensioned as to hold, as for example, approximately 1,800 bases in a single vertical layer with each of the bases oriented with its axis extending horizontally and the open ends of the bases facing in a common direction.

Each cell is provided with two inlet openings in its upper wall with which loading carriage is operatively aligned during the loading of the cell.

The lower or bottom wall of the cell is formed with a cell gate which when closed is operable to prevent bases from being discharged from the cell.

To unload bases from the cell, an unloading carriage 60 mounted for movement from right to left and vice versa as viewed in FIG. 1 is moved into operative alignment with the bottom wall of the cell. When unloading carriage 60 is operatively positioned beneath the cell, mechanism not shown in FIG. 1, on carriage 60, is actuated to open the cell gate to permit bases to flow by gravity from the cell into carriage 60. Carriage 60 discharges the bases onto the upper run of a belt conveyor 62 which conveys the received bases to the right as viewed in FIG. 1. In order to permit the cell to be rapidly unloaded, the width of the gate opening in the bottom of the cell is such that several bases can be discharged simultaneously and move in side by side relationship along conveyor 62. Bases are discharged from conveyor 62 into a single liner 64 which organizes the bases into a single line in which they are pneumatically conveyed to the upper end of a demand accumulator 66. Demand accumulator 66 is in general structurally similar to supply accumulator 48.

Unloading of the cells is initiated in response to the number of bases contained in demand accumulator 66. When demand accumulator 66 is substantially full of bases, conveyor 62 is stopped and unloading carriage 60 is held in its position in the event it is located beneath a partially unloaded cell at this time. When the number of bases in demand accumulator 66 falls below a selected upper level, conveyor 62 is driven at a low speed to supply bases to accumulator 66, and upon the emptying of a cell, unloading carriage 60 is shifted to a new full cell. In the event that the number of bases in demand accumulator 66 decreases to a still lower level, conveyor 62 can be accelerated to drive at one or more higher rates of speed.

Figure 24:
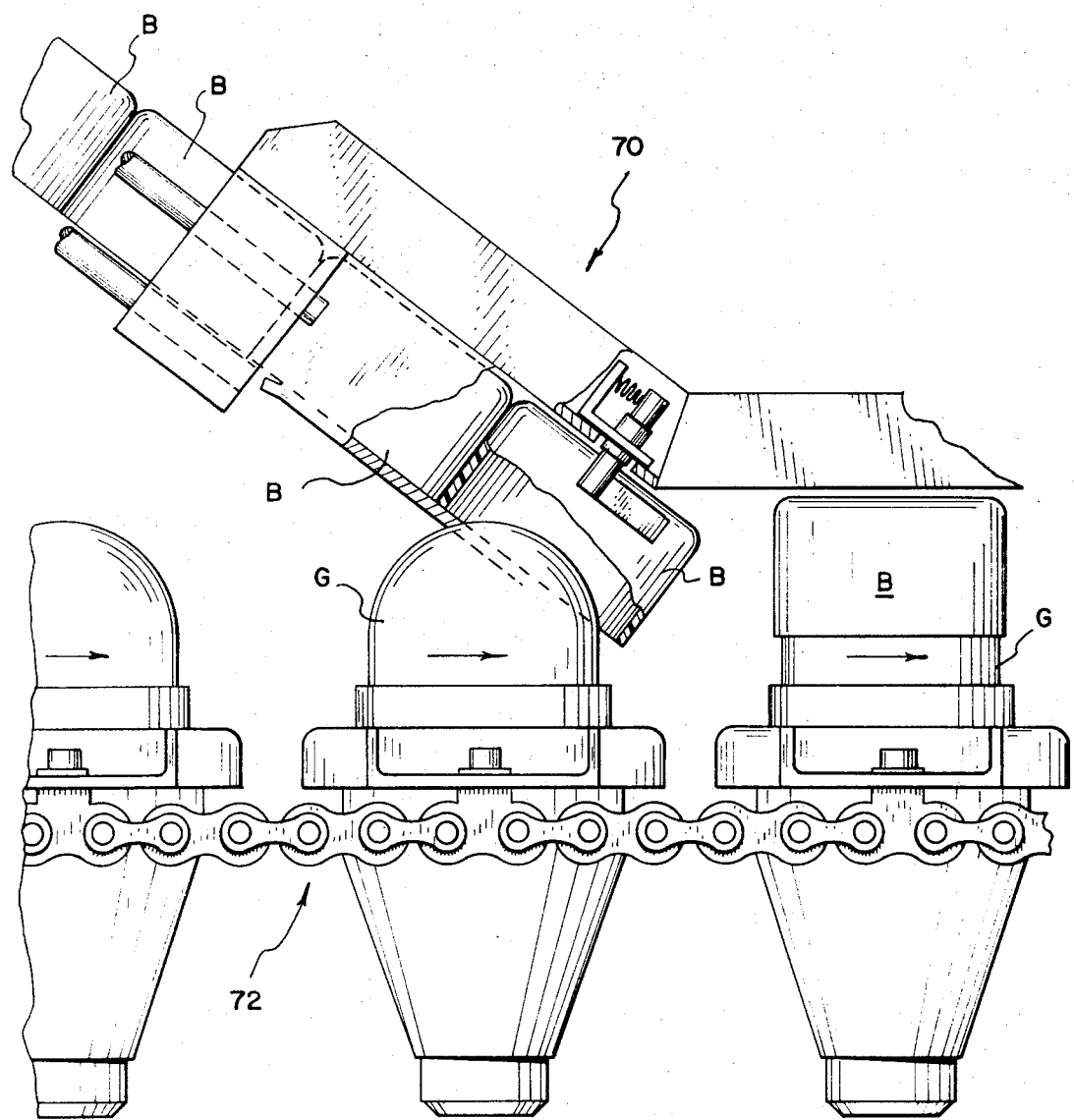
FIG. 24 is a detail side elevational view of a portion of the assembly machine to which bases are fed by the system of FIG. 1, showing the manner in which the base elements are captured by the glass components of the composite container shown in the FIG. 1b.

Bases continuously flow by gravity and in a single line from the lower end of demand accumulator 66 into a pneumatic conveyor 76 which conveys the bases to the supply chute 70 of assembly machine 72 from which the bases are stripped and assembled upon the glass container components G conveyed along machine 72 as best seen in FIG. 24. This assembly operation is described in detail in the aforementioned copending application of Mallory et al., Ser. No. 883,515.

Referring briefly to FIG. 24, supply chute 70 positions the end most base in line in a downwardly inclined position with the open end of the base lowermost and located in a path such that the passage of a glass container component G on the conveyor of machine 72 beneath the end of the supply chute will strip the end most base from the chute. Upon the removal of a base from the end of chute 70, the gravitational pressure of the bases in chute 70 automatically advances the bases to position another base at the end of the chute before the next glass container arrives at the chute. In the event that there is a gap in the line of glass containers due to ejection of one or more containers from the glass line, the line of bases remains in chute 70 until another glass container is advanced to operative engagement with the base in the end of the chute. Thus, bases are removed from chute 70 in exact accordance with the demand of the glass line.

In the event of a massive gap in the glass line, bases will back up from chute 70, through the pneumatic conveyor back to the outlet of demand accumulator 66, thereby causing the number of bases maintained in the demand accumulator to increase until accumulator 66 is filled. Filling of the demand accumulator 66 automatically discontinues the unloading of storage cells 56. In this event, loading of cells 56 will continue until all cells are loaded. At this time, the control system will shut down the various components upstream of the storage cell assembly successively as the line becomes filled.

Both the base supply system described generally above and the glass line which supplies glass container components to assembly machines 72 are operated under the control of a computer. In addition to monitoring and automatically controlling various functions of the glass line, the computer is employed by the base supply system to maintain an inventory of the status of the various cells 56 to select the particular cells to which loading carriage 58 or unloading carriage 60 will be shifted. The computer is further employed in connection with the inspection system to prevent, during normal operation, the unloading of any cells 56 into which bases having suspected substandard decorations may have been loaded. In addition, the computer enables the storage within storage cell assembly 50 of bases having different labels. This is of great convenience when the overall production line must be shifted from the supplying of completed containers bearing one label to supply containers bearing a different label, since it enables a supply of bases bearing the second label to be maintained within a sufficient number of cells 56 to supply assembly machine 72 with the new label during the period of time between the shifting over of decorator 42 to decorator 42a and the arrival at storage cells 56 of the first bases which have passed through decorator 42a after the shift over. The computer, by means of suitable memory devices, maintains an inventory of which cells are filled, which cells are empty, and which, if any cells have a malfunction. Where more than one type of label is stored in the storage cells, the computer memory further maintains an inventory of those cells which are filled with bases bearing the first label and which cells are filled with bases bearing the second type of label. The computer further is coupled with the inspection station to hold as unavailable for unloading any cell into which bases having a suspected substandard decoration have been loaded.

In the event any of cells 56 have been loaded with bases having a decoration of substandard quality, these particular cells are emptied during periods of non-production by manually operating the control system to shift unloading carriage 60 under the appropriate cells. The substandard bases pass through unloading carriage 60, conveyor 62 and demand accumulator 66 and are switched into a branch scrap line 78 at a point between demand accumulator 66 and supply chute 70 of assembly machine 72.

CELL LOADING APPARATUS

Figure 2:
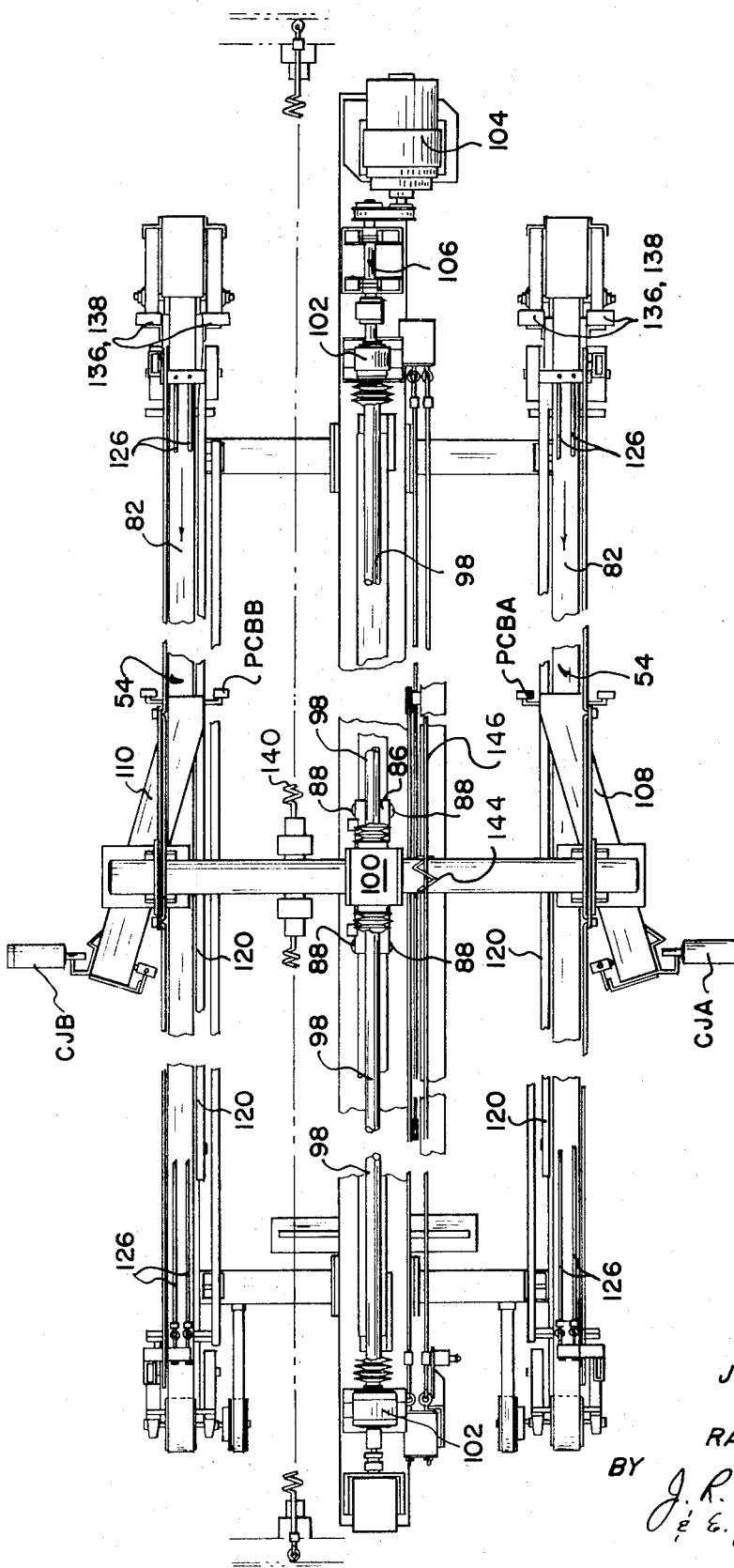
FIG. 2 is a top plan view, with certain parts omitted, broken away or shown schematically, of the storage cell loading apparatus employed in the system of FIG. 1.

As the bases leave supply accumulator 48 and move past gates 52, they enter the cell loading apparatus whose details are best shown in FIGS. 2 through 7. In general, the cell loading apparatus includes two belt conveyor assemblies 54 and loading carriage 58, both of which are supported on a suitable framework 80 to overlie the bank of storage cells 56. As best seen in FIG. 2, two belt conveyors 54 are employed and extend across and above the entire length of the bank of storage cells 56. Bases to be loaded into the cells are fed from accumulator 48 to the right hand end of the upper run of the belts 82 as viewed in FIGS. 2 and 3. Loading carriage 58 is supported upon frame 80 for horizontal movement in either direction parallel to the upper runs of the conveyors 54.

Figure 4:
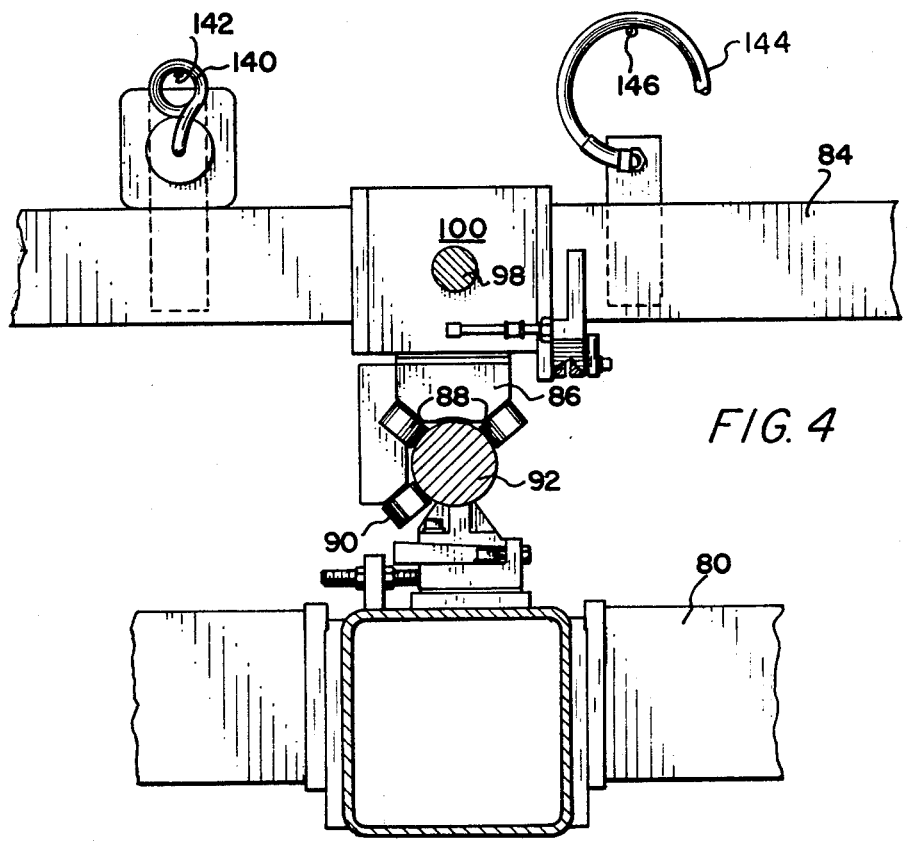
FIG. 4 is a detail front view showing the central portion of the loading carriage.
Figure 20:
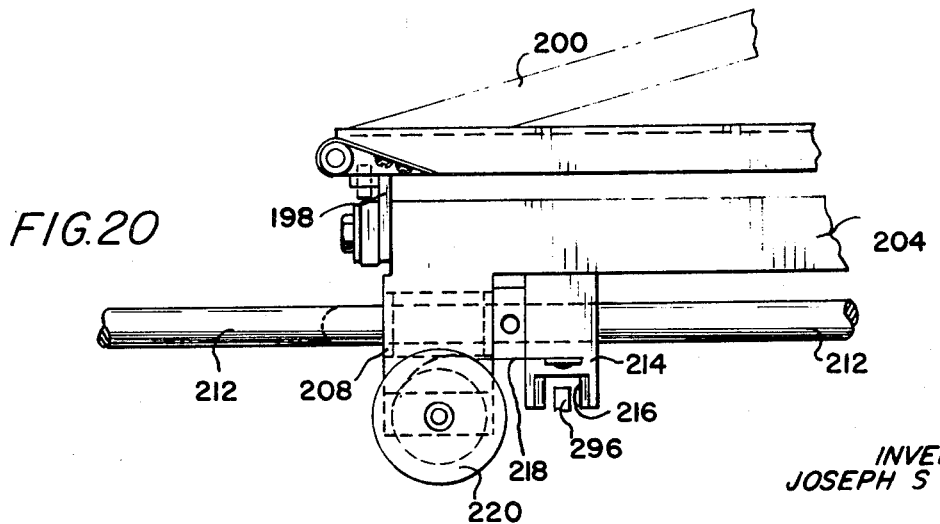
FIG. 20 is a detail side elevational view of the structure adjacent one side of a cell discharge opening.
Figure 8:
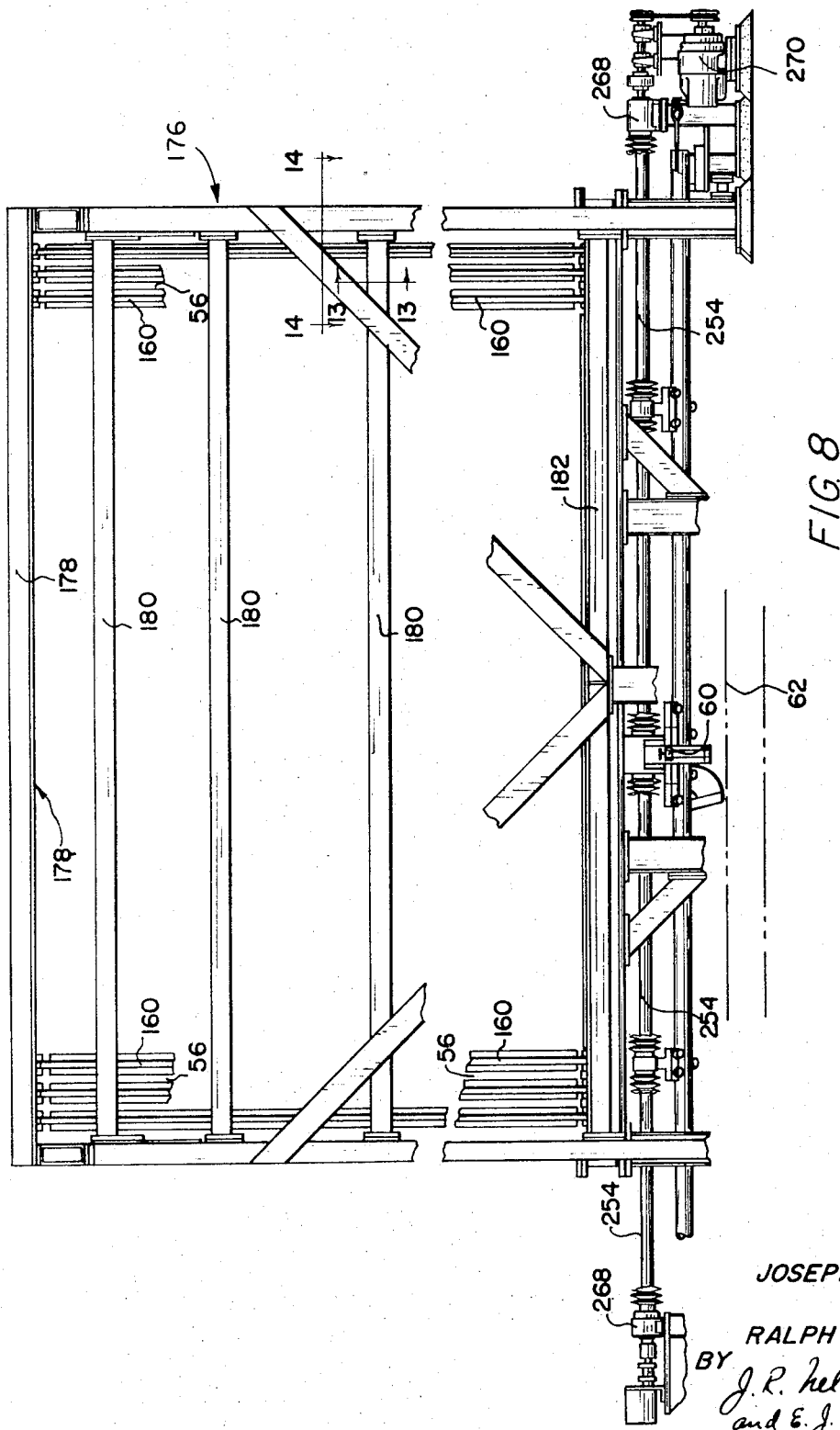
FIG. 8 is a side elevational view, with certain parts broken away or omitted, of the storage cell assembly.

Referring now to FIGS. 2, 4 and 5 it is seen that loading carriage 58 is constructed with a rigid cross frame member 84 which extends transversely of the direction of movement of carriage 58 and overlies both of conveyors 54. A carriage mount 86 is fixedly secured to the midportion of frame member 84 and carries a pair of roller assemblies at each end, each roller assembly including rollers 88 and a retainer roller 90. Rollers 88 and 90 engage the circumference of a cylindrical carriage support rail 92 which is fixedly mounted on frame 80 to support and guide carriage 58 in movement back and forth across the top of the storage cells 56. The carriage is stabilized at opposite ends by a pair of support rollers 94 (FIG. 5) mounted beneath frame member 84 at symetrically disposed positions opposite sides of the center of frame member 84. Rollers 94 ride along support tracks 96 fixedly mounted on the fixed frame 80.

Carriage 58 is driven in movement along the path established by support rail 92 and support tracks 96 by a ball screw 98 which is threadably received within a ball nut housing 100 mounted on the center of cross frame member 84. Ball screw 98 is rotatively supported in bearing assemblies 102 mounted at the opposite ends of frame 80 (FIG. 3) and is driven by a reversible drive motor 104 connected via a suitable drive coupling 106 to one end of screw 98. Motor 104 is operated under the control of a numerical positioning control system which positions loading carriage 58 in alignment with a selected one of the individual storage cells 56 by monitoring the angular position of screw 98. Extremely accurate positioning systems of this type are commercially available from the Allen-Bradley Company of Milwaukee, Wisconsin, and therefore will not be described in detail.

Unloading chutes 108 and 110 are fixedly mounted at each of the opposite ends of cross frame member 84, to transfer bases being conveyed along the upper runs 82 of conveyors 54 into the storage cell 56 with which the carriage 58 is operatively aligned. Chutes 108 and 110 are of similar construction, differring solely in being right or left handed. Each chute includes a curved top plate 112 which defines the top wall of the chute. A plurality of U-shaped brackets such as 114 are fixedly secured to the curved top plate 112 and project perpendicularly from plate 112 to support guide rods 116 which define the side and bottom walls of the chute.

Referring to FIG. 5, at the upper or inlet end of the chute, one of the guide rods 116 which defines one side of the chute is extended laterally across and above the upper run 82 of the base conveyor and is supported by two or more brackets 118. The terminal end of this latter guide rod 116 projects into the space between the legs of a horizontally disposed U-shaped guide bracket 120 which is fixedly supported from the frame of conveyor 54 and extends along the entire length of upper run 82 to provide a stationary guide rail at one side of belt 82. Bases passing along upper run 82 engage the guide rod 116 and are deflected by the guide rod into chute 108. The curvature of the chute is such that during their passage through the chute the bases are deflected from a horizontal position on belt 82 into a vertical position as they pass from the chute outlet at 122 and through an inlet opening 124 into the interior of a cell 56.

Figure 3:
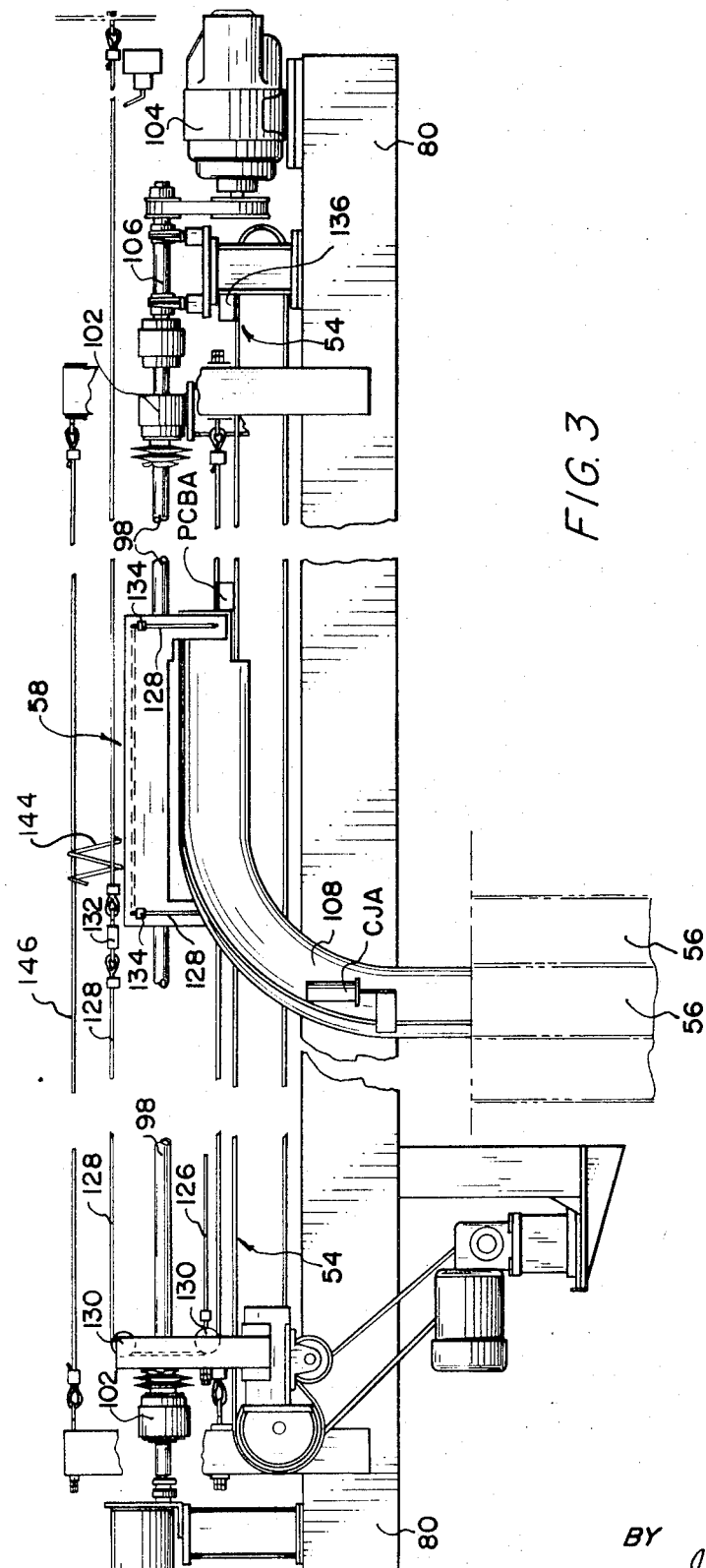
FIG. 3 is a side view of the loading apparatus of FIG. 2, again with certain parts broken away or omitted.

In addition to guide rail 120, bases are guided and maintained upon belt 82 by a pair of fixed cables 126 which are secured at their opposite ends to frame 80 and pass freely through chute 108 as best shown in FIG. 3. The guiding of the bases on the side opposite guide rail 120 is accomplished by an endless cable 128 operatively trained about four pulleys 130 mounted in pairs at the opposite ends of conveyors 54. Cable 128 is formed into an endless cable by joining the ends of a length of cable to each other as by a spring 132 which applies a predetermined tension to the cable. The cable is fixedly clamped to its associated chute assembly by passing the cable through a plate on the chute assembly and fixedly clamping the cable as by clamps 134 to the plate. This interrupts the extent of the lower run of cable 128 as viewed in FIG. 3 to provide the opening through which the bases are deflected into the chutes 108 or 110. Cable 128 thus moves when carriage 58 moves, the endless cable passing around the pulleys 130 as required.

During the loading of the bases into the individual cells 56, the computer controlled inventory system is supplied with a count of the bases being loaded into the cell. Counting is accomplished by mounting a photocell 136 adjacent the inlet end of each belt, the photocell being energized by a source of light from a light source 138 and electrically connected in a conventional manner to control a counter which supplies the computer with a count of the bases fed into the particular storage cell 56 from each of the two chutes 108 and 110.

Electrical power for the photocell system is fed to carriage 58 by a coiled extensible electric cable 140 slideably supported on a fixed cable 142 mounted on the machine frame. To assist in impelling the bases through the respective chutes 108 and 110, a coiled air hose 144, connected to a source of air under pressure, is supported upon a second fixed support cable 146 to supply air to the carriage, the air being discharged into the respective chutes 108 and 110.

Figure 26:
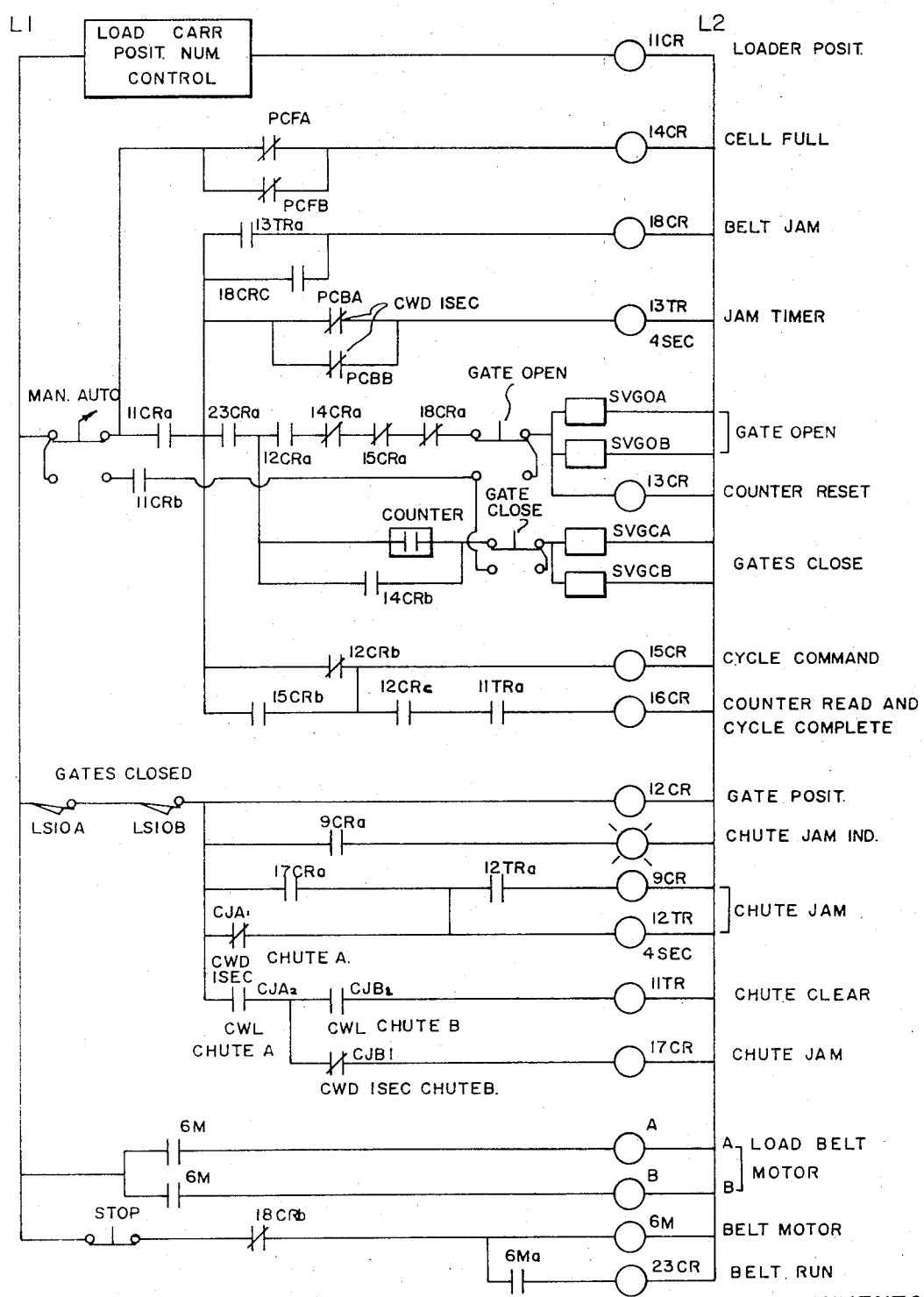
FIG. 26 is a simplified schematic electrical diagram showing electrical circuitry employed in the control of the operation of loading of the storage cells.

In FIG. 26, there is shown a simplified electrical schematic diagram of the electrical control circuit for controlling loading of the storage cells. As will be recalled from the mechanical description of the cell loading apparatus, bases are fed into the cells from storage accumulator 48 via two parallel belt conveyors 54, each of which is provided with a gate 52 at its inlet end and feeds the bases to one of two chutes 58 carried on the loading carriage. The two belts and their associated structures normally operate simultaneously and, in the description of the circuit diagram of FIG. 26, the various elements associated with the belt 54 at one side of the system will be designated with subscripts A while the corresponding components associated with the other of the two belts 54 will employ the same reference numeral with a subscript B. Each of the two belts 54 has three photocells associated with it — namely the counting photocell 136 located at the downstream side of gate 52, a belt jam detecting photocell PCB located adjacent the inlet to chute 58, and a cell full photocell PCF located adjacent the discharge end of gate 58 and actuated by a light directed through the upper portion of the storage cell.

The cell which is to be loaded is selected by the computer in a manner described below and the loading carriage is driven into alignment with the selected cell upon command of the computer by a numerical positioning control system, commercially available from Allen-Bradley of Milwaukee, Wisconsin. Referring now to the electrical diagram of FIG. 26, when the loading carriage is positioned in operative alignment with the selected cell, the numerical positioning control system energizes a master or loader position control relay 11CR which, when energized, closes a set of master contacts 17CRa. The circuit of FIG. 26 is shown set for automatic operation by manually positioning a MAN-AUTO switch in the AUTO position illustrated.

At the commencement of a loading cycle, the gates 52 are closed, this operation being performed at the conclusion of the preceding loading cycle, and the drive motors of the two belts 54 are running. Upon closure of the master control relay 11CR and the consequent closing of its contacts 11CRa, the first step in the loading process is to open the gates. This is accomplished via contacts 23CRa which are closed whenever the belt motors are running, contacts 12CRa, closed whenever the gates are closed, contacts 14CRa which are closed whenever the aligned cell is not full, contact 15CRa which are closed whenever control relay 15CR is not energized, contacts 18CRa which are closed whenever the loading belts are not jammed and normally closed manual gate opening contacts to solenoids SVGOA and SVGOB. These two latter solenoids actuate the gate opening motors of the two gates 52 to open the gates, the moving belts advancing the bases from gates 52 to the loading chutes 58. Simultaneously with the energization of the gate opening solenoids, control relay 13CR is energized to reset to zero the counter controlled by the two counting photocells 136 A and B mentioned above.

To briefly review the contacts in the chain required to energize the gate opening solenoids SVGOA and B, contacts 23CRa are controlled by a control relay 23CR (bottom line of the diagram of FIG. 26) which is connected in parallel with the belt motor control relay 6M via contacts 6Ma. Relays 6M and 23CR are normally energized at all times, these relays being de-energized only by manual depression by a stop button or by the opening of contacts 18CRb, these latter contacts being closed in a manner to be described below in the case of jamming of one or more of the conveyor belts. Contacts 12CRa are controlled by gate position relay 12CR which is energized only when the gates are away from their open positions as detected by gate closed limit switches LS10A and LS10B.

Contacts 14CRa are normal closed controlled by a cell full control relay 14CR which is energized to open contacts 14CRa only when one of the two cell flow detecting photocells becomes dark for a predetermined period of time, indicating filling of the cell.

Contacts 15CRa are controlled by cycle command relay 15CR. Cycle command relay is employed to sense the initiation of a loading cycle and is energized by the closure of contacts 12CRb which close upon the de-energization of relay 12CR.

Contacts 18CRa are controlled by a belt jam detecting relay 18CR which in turn is energized in a manner to be described below should one or both of the belts be jammed.

After the gates are opened, the circuit to the gate opening solenoid is broken by the opening of contacts 12CRa and contacts 15CRa. Loading of the cell via both belts 54 will continue under normal conditions until either the COUNTER operated by the base counting photocells indicates a cell full count or in the event that either of the cell full detecting photocells PCFA, PCFB, one at each side of the cell, becomes dark, indicating that its particular side of the cell is filled. The two cell full detecting photocells contacts, identified in the diagram as PCFA and PCFB, are both of a closed when dark type (CWD) the contacts having a minimum selected time delay closure. Closure of either energizes relay 14CR to close contacts 14CRb to energize the gate closing solenoids SVGCA and SVGCB which, when energized, drive the gates 52 to their closed position to stop the flow of bases onto conveyor belts 54. Energization of the gate closing solenoids is alternatively accomplished when the COUNTER contacts indicate the reaching of a preset count.

It will be recalled that upon the starting of the loading cycle by the opening of gates 52, relay 12CR became de-energized by the opening of limit switches LS10a and LS10b. When relay 12CR became de-energized, its normal closed contacts 12CRb closed, energizing relay 15CR which immediately locked itself in by lock in contacts 15CRb. When the gates are driven to their closed position to stop the flow of bases to the nearly completely filled cells, limit switch contacts LS10a and LS10b are reclosed to re-energize relay 12CR. Also, after the final bases have been deposited in the cell and the loading chutes 58 are clear, a chute jam detecting photocell will be exposed to light if the chute is clear or will be dark if the chute is jammed. If both chutes are clear, contacts CJA2 and CJB2 will be closed to energize, upon closure of the gate limit switches, a 10 second delay timing relay 11TR. Returning now to the cycle command section involving relays 15CR and 16CR, it will be recalled that contacts 15CRb have locked in relay 15CR and upon the closure of contacts 12CRc by the re-energization of relay 12CR and the closure of contacts 11TRa 10 seconds after relay 11TR is energized, will cause energization of control relay 16CR. Relay 16CR controls several contacts not shown in the diagram of FIG. 26 but which perform the functions of causing the counter to transmit a signal to the computer to indicate the number of bases loaded into the cell and to advise the computer of the completion of a loading cycle, thus causing the computer to select the next cell to be loaded and actuate the loading carriage positioning and control system to shift the carriage to the newly selected cell. Movement of the carriage being under the control of the numerical positioning control system, as soon as the loading carriage is signaled by the computer to move, the numerical control system de-energizes relay 11CR, thereby openings contacts 11CRa and de-energizing the gate actuating circuit so that the gates remain in their closed position while the carriage is being shifted to its new location.

To protect the system in the event of a jam during the loading operation, photocells PCB are located adjacent each chute inlet 58 to be illuminated by a beam of light directed across the path followed by the bases along the respective loading belts 54. The bases are fed along the respective belts 54 in single line with the bases normally spaced a slight distance from each other, thus causing the photocells PCB to be intermittently illuminated during normal operation. In the event the flow of bases becomes jammed, the bases on belts 54 crowd up against each other, thus blocking the photocells PCB against exposure to light. Photocells PCBA and PCBB are provided with contacts which are set to close when the photocell is dark for more than one second. The contacts of photocells PCA and PCB are connected in parallel to energize a timing relay 13TR upon closure of the contacts of either of the two photocells. Relay 13TR controls contacts 13TRa which are set to close upon energization of relay 13TR for a minimum period of four seconds, thus requiring the darkening of one of photocells PCBA or PCBB for a minimum period of 5 seconds to indicate a belt jam. Upon closure of contacts 13TRa, a belt jam control relay 18CR is energized and immediately locks itself in by its lock in contacts 18CRc. Energization of belt jam relay 18CR also opens contacts 18CRb to de-energize belt drive motor control relay 6M, thereby stopping belts 54.

The circuit also includes circuitry to check to make sure that the loading chutes 58 are clear at the conclusion of the loading operation. This check is performed after the gates are closed at the end of the normal loading operation and includes chute jam photocells CJA and CJB associated with respective loading chutes. Photocell CJA controls two contacts, one of which is CJA1 which is closed when dark with a one second delay to indicate a jam in the chute on one side of the loading carriage and contacts CJA2 which are closed when lit, thus indicating that chute A is clear. Photocell CJB, associated with the other chute likewise controls similar closed when dark and closed when lit contacts CJB1 and CJB2 respectively.

As described above, if both contacts CJA2 and CJB2 are closed, indicating clear chutes on both sides, timing relay 11TR is energized to signal, with a ten second delay, the clearing of the chutes and the successful completion of the loading of the cell.

If the "A" chute is jammed, its closed when dark contact CJA1 will close to energize a chute jam timing relay 11TR which, after a 4 second delay, will close contacts 12TRa to energize a chute jam relay 9CR which, in turn, closes contacts 9CRa to energize a chute jam indicator which signals to the machine operator the existence of a jam. Contacts CJA1 can be closed only when photocell CJA is dark, hence contacts CJA2 remain open and thereby prevent the transmission of a cycle complete signal to the computer.

If loading chute 58A is clear, but loading chute B is jammed, contacts CJA2 will be closed, contacts CJB2 will be open and contacts CJB1 will be closed, thus energizing a second chute jam relay 17CR. When energized, relay 17CR closes contacts 17CRa to energize relay 12TR which then functions as described above to indicate the existence of a chute jam.

The circuit of FIG. 26 also includes a provision for manual operation of the gate and closing by means of the manually actuated "GATE OPEN" and "GATE CLOSED" buttons. To operate the system manually, the MAN-AUTO switch is shifted from the indicated position to open the contacts shown closed in the drawings and to close the contacts immediately below. Operation in the manual mode is conditioned upon the alignment of the loading carriage with a cell by closure of contacts 11CRb. Operation in the manual mode requires the gates to be opened or closed under the control of the machine operator and does not provide for the counting of bases flowing into the cell or the signalling of a full photocell PCF. However, the chute jam circuitry is operable in the manual mode by the closing of the gates at the conclusion of manual loading of the cell.

STORAGE CELLS

The construction of storage cells 56 is best shown in FIGS. 8 through 21.

Figure 9:
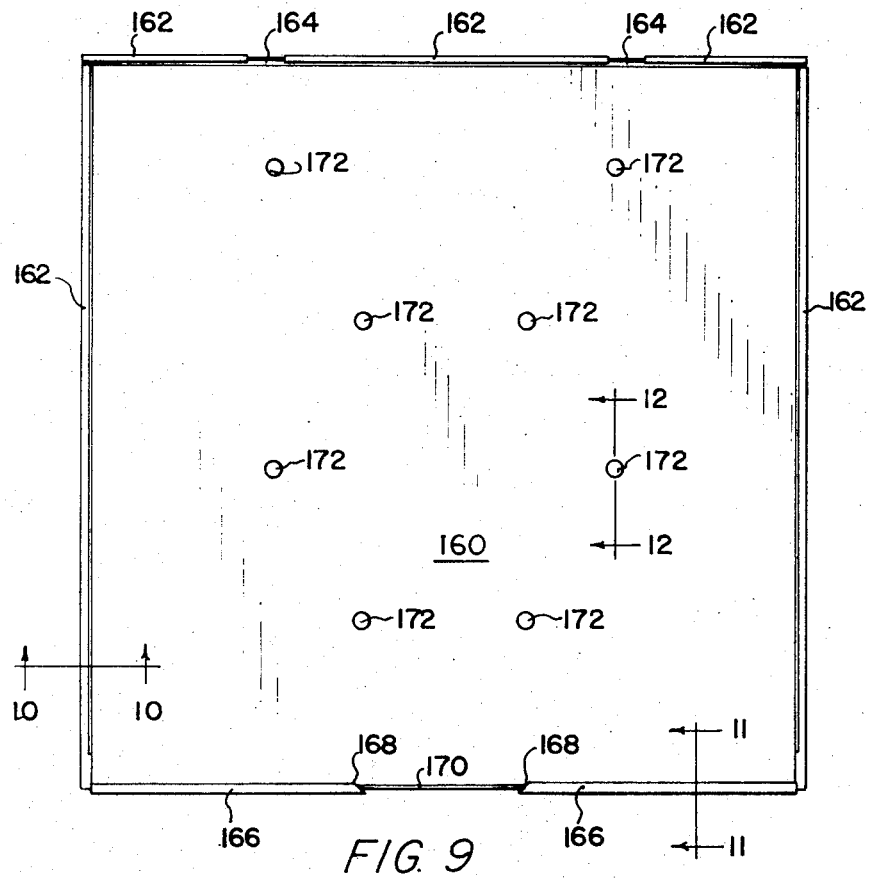
FIG. 9 is a front view of one of the storage cells partition panels.
Figure 12:
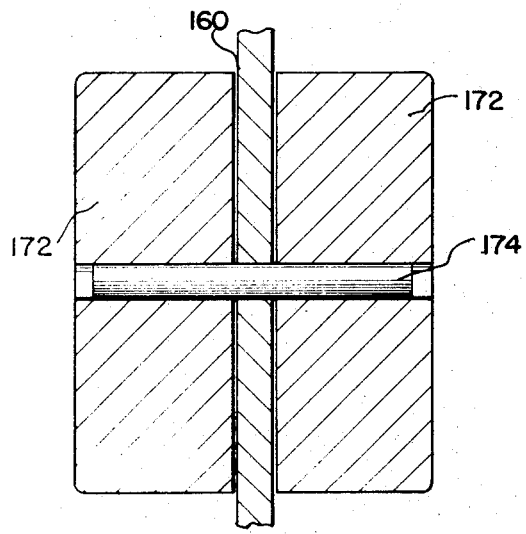
FIG. 12 is a detail cross sectional view taken on line 12—12 of FIG. 9.
Figure 10:
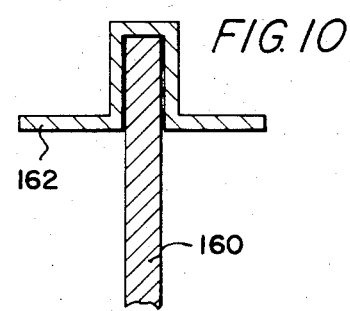
FIG. 10 is a detail cross sectional view taken on line 10—10 of FIG. 9.
Figure 11:
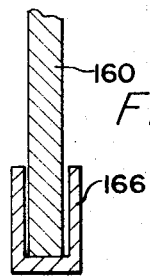
FIG. 11 is a detail cross sectional view taken on the line 11—11 of FIG. 9.
Figure 15:
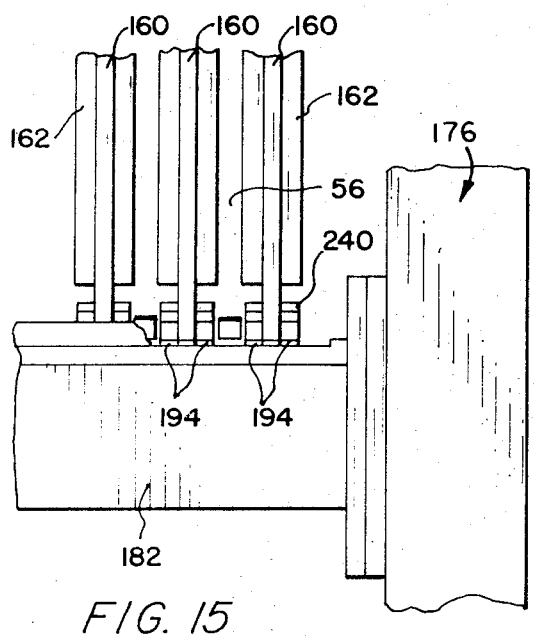
FIG. 15 is a detail side elevational view showing the lower portion of the cell partition and the manner in which they are supported.

Referring first to FIGS. 8 through 12, the cells are constructed from a plurality of like partition assemblies whose main component is a flat vertically disposed partition panel 160. Typically, panel 160 may have dimensions of the order of approximately 10' × 10' × ¼" in thickness. Channel-shaped partition frame members 162 of a cross sectional configuration best shown in FIG. 10 are fitted upon and bonded to the top and vertical side edges of panel 160 to provide a stiffening action to the panel. Along the top edge of the panel, frame elements 162 are interrupted at two locations 164 to form a portion of the base inlet openings 124 of the individual cells. Bottom frame members 166 of a U-shaped cross sectional configuration best shown in FIG. 11 are fitted upon and bonded to the bottom edge of panel 160. As best seen in FIG. 9, the inner ends of the bottom frame elements 166 are spaced from each other as at 170 and beveled downwardly and inwardly of the panel, this region constituting the base outlet opening of the assembled cells. At several locations over the main surface of panel 160, spacers 172 are bonded to opposite sides of the panel as best seen in the cross sectional view of FIG. 12, the spacers being positioned as by a dowel 174.

Referring now to FIGS. 8 and 13 through 16, the individual partition assemblies are assembled into a fixed frame assembly designated generally 176 to define storage cells 56, each of the intermediate partitions defining a common side wall between two adjacent cells 56.

Among other structural members, cell frame 176 includes four top frame members 178 which extend longitudinally along the top of the cell frame assembly, four side frame members 180 extending longitudinally along each side of the cell frame assembly, and a pair of bottom frame members 182 which extend longitudinally along the lower corners of the cell frame assembly. The individual partitions are supported and held in position by structure mounted on the longitudinal frame members 178, 180 and 182 in a manner described in more detail below.

Figure 13:
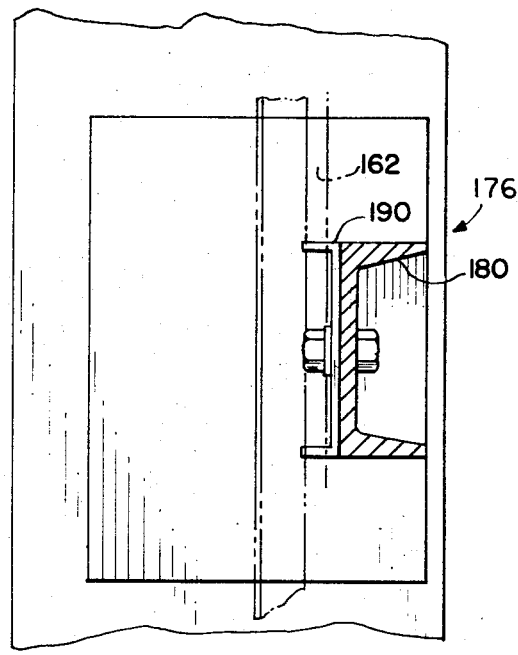
FIG. 13 is a detail cross sectional view of the cell frame assembly taken on line 13—13 of FIG. 8.
Figure 14:
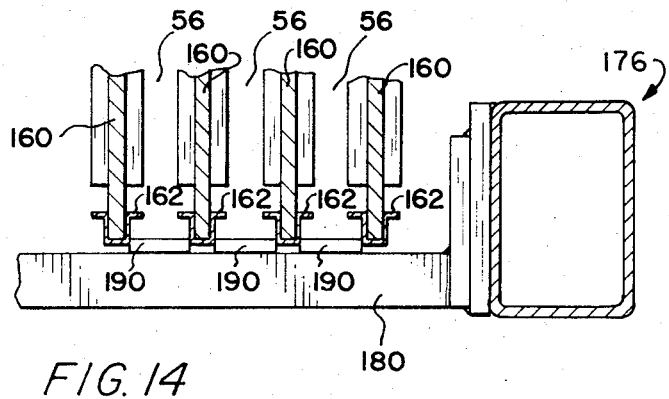
FIG. 14 is a detail cross sectional view taken on the line 14—14 of FIG. 8.
Figure 16:
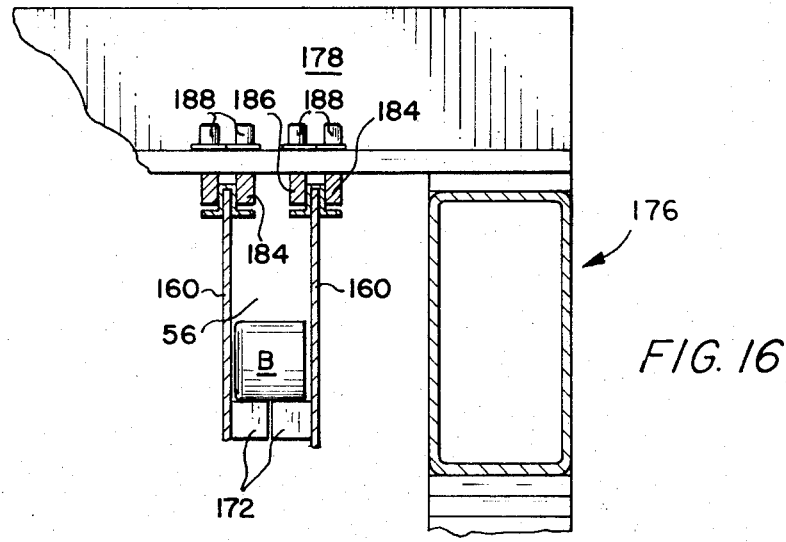
FIG. 16 is a cross sectional view taken on a vertical plane perpendicular to the general plane of the cell partitions adjacent the top portion of the cell assembly.
Figure 21:
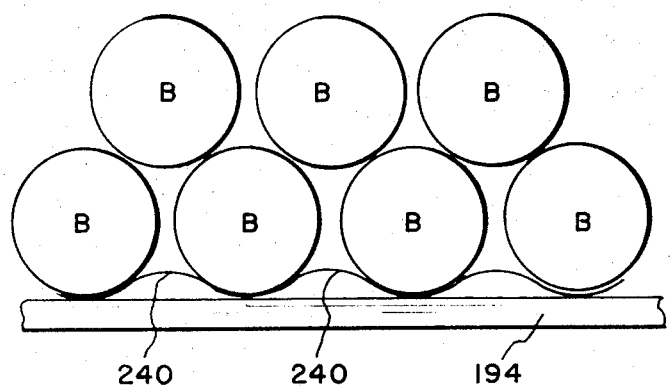
FIG. 21 is a schematic diagram illustrating the manner in which the bases are supported on the cell bottom.

Referring now to the cross sectional view of FIG. 16, it is seen that each of the top longitudinal frame members 178 has a plurality of pairs of partition guide elements 184, 186 which are fixedly secured as by bolts 188 to frame member 178 to grip opposite sides of the upper panel frame elements 162 of the individual partitions to position the top edges of the partitions in the desired spaced relationship to each other. At each of the longitudinally extending side frame members 180, channel-shaped spacer elements 190 are engaged between the panel frame members 162 of adjacent panels to maintain the spacing between the panels, as best seen in FIGS. 13 and 14.

Figure 22A:
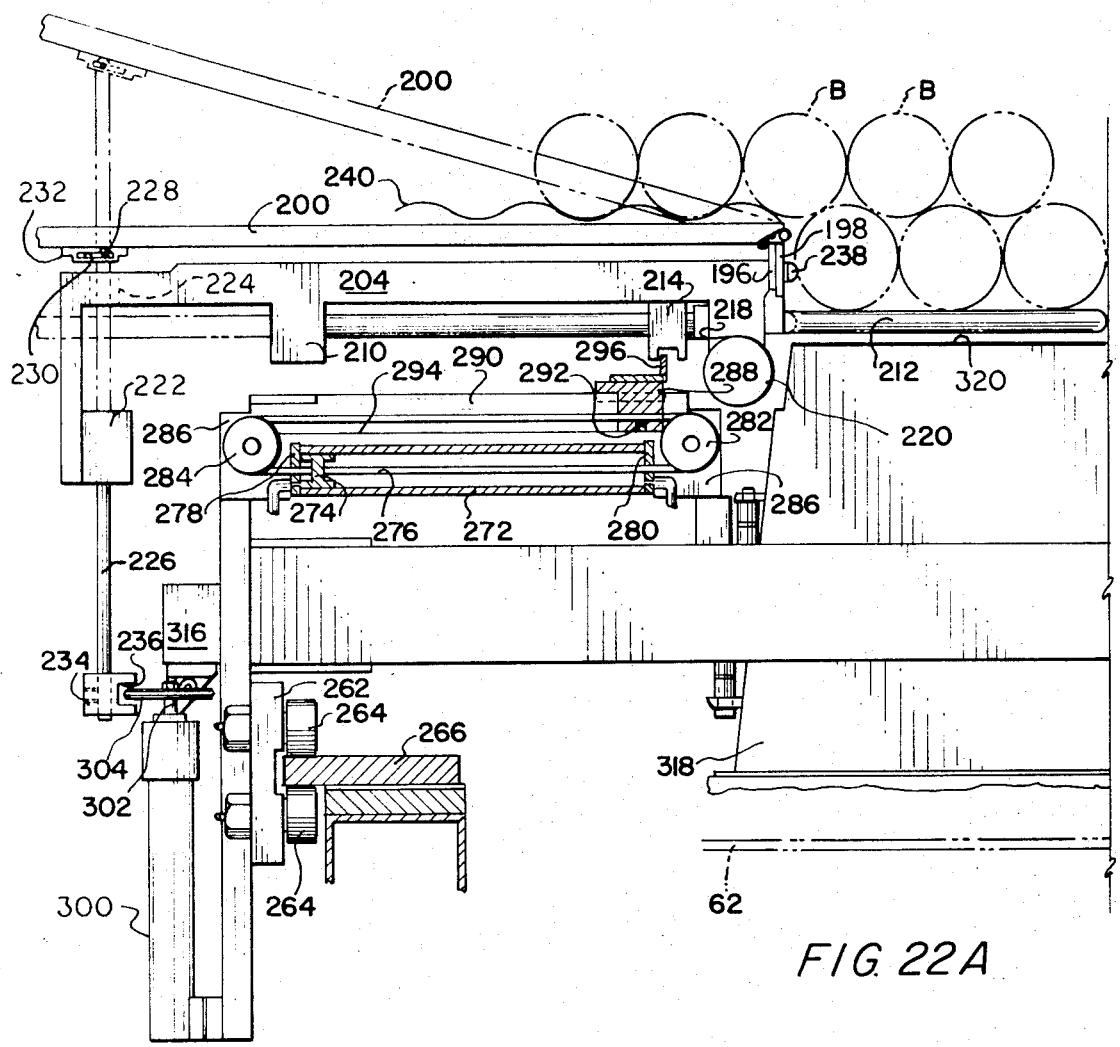
FIGS. 22a and 22b are respectively the left and right hand portion of a detail cross sectional view taken on a vertical plane through the lower portion of the cell assembly in a plane parallel to that of the cell partitions, showing details of the unloading carriage.
Figure 19:
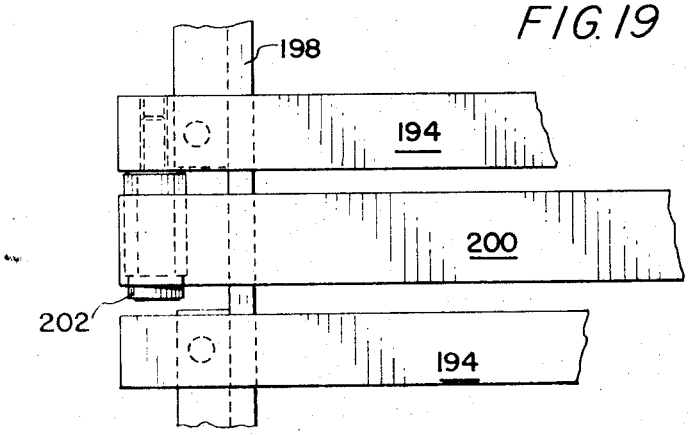
FIG. 19 is a detail top plan view of the structure shown in FIG. 18.
Figure 22B:
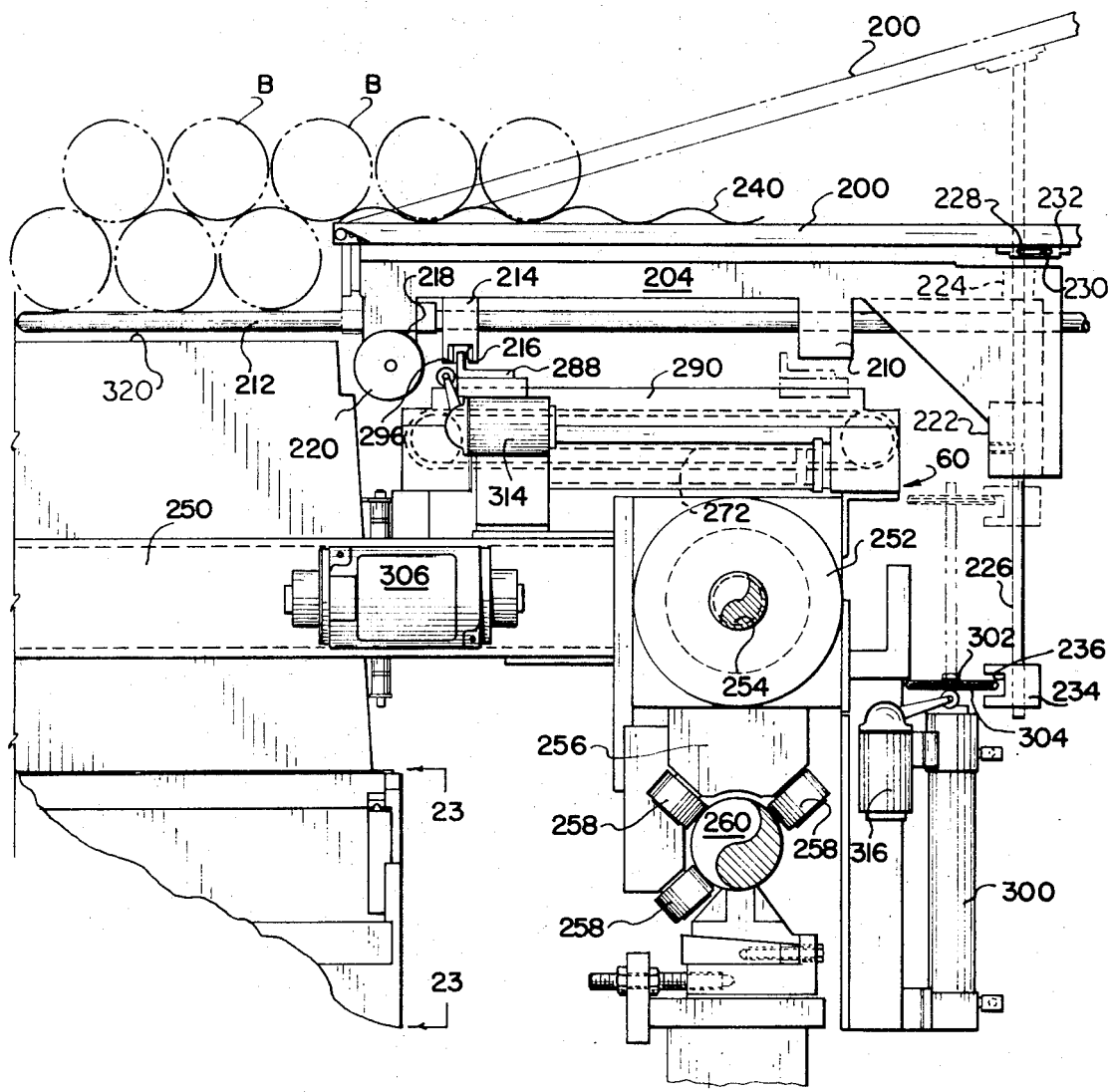

The bottom edges of partition panels 160 are engaged between respective pairs of partition guides 194 which are supported upon and extend between the lower corner frame members 182 and a pair of spaced bottom frame members 196 which likewise extend longitudinally of the cell assembly. As best seen in FIGS. 17 and 22A, 22B, partition guides 194 do not extend entirely across the bottom of the cell assembly but terminate at inner ends which will lie adjacent to the inner ends 168 of panel frames 166 to provide a clearance for the outlet opening of the cells. Because the inner ends of partition guides 194 are cantilevered inwardly beyond the inner supporting frame members 196, the free inner ends of guides 194 are fixedly secured to stabilizer bars 198 which extend longitudinally of the cell assembly approximately along the opposite sides of the base discharge openings of the cells.

Between each pair of partition guides 194, a flipper bar 200 is pivotably supported at its inner end by a pivot pin 202 mounted in the inner end of one of the few partition guides 194. Flipper bar 200 and the two adjacent partition guides 194 define the bottom wall of a cell with the exception of the base discharge opening which is constituted by the open region between the inner ends of aligned partition guides 194 and flipper bar 200 on opposite sides of the cell assembly.

As best seen in FIG. 18 spaced opposed support brackets 204 are fixedly mounted on each of bottom frame members 196 to extend horizontally toward the center of the cell assembly in underlying relationship to each of the cells 56. Each support bracket 204 is bolted at its outer end to frame member 196 and is formed with inner 208 and outer 210 horizontal bushings which slidably receive and support a gate rod 212 which, when located in the normally extended position shown in FIG. 17, projects inwardly beyond the inner end of support arm 204 to a position just short of the center of the cell discharge opening. The gate rods 212 at opposite sides of the cell are located in alignment with each other and, when in their extended position, (see FIGS. 22A, 22B) project across the cell discharge opening to prevent bases contained in the cell from falling through the opening. A retracting block 214 is fixedly secured to each gate rod 212 and is formed with an actuator receiving slot 216 in its lower edge. A gate retracting mechanism carried on unloading carriage 60 is engageable within slot 216, in a manner to be described in more detail below, to pull the gate rods outwardly to a position clear of the cell discharge opening to permit the discharge of cells from the bases.

Gate rods 212 are resiliently biased to their extended position by a constant force extension spring 218 (FIG. 20) wound on a spring drum 220 carried upon the inner end of each arm 204.

In addition to supporting gate rods 212 for horizontal reciprocating movement, a vertically disposed bushing 222 integrally formed on the outer end of each support arm 204 and a vertically aligned bore 224 in a web of arm 204 slideably receive a flipper bar operating rod 226. A horizontally projecting pin 228 in the upper end of each rod 226 is slideably received within a horizontally elongated slot 230 formed in a bracket 232 fixedly mounted on the lower side of each flipper bar 200. A drive block 234 is fixedly mounted on the lower end of each operating rod 226 and formed with a slot 236 which is cooperable with an actuating device carried by unloading carriage 60 to elevate the flipper rod 200 from its normally maintained horizontal position to the inclined position indicated in FIG. 22A, 22B.

Bases are stored in the individual cells 56 on their side — that is with the axis of the cylindrical base element extending horizontally. In order to maintain the stored bases in this desired horizontal orientation, the spacing between adjacent partition panels 160 established by the structure described above is set at a dimension which slightly exceeds the axial dimension of the base so that bases can drop freely between the opposed partition panels 160 dividing the opposite sides of the individual cell while at the same time preventing the freely falling bases from becoming tilted or skewed to an extent that they might frictionally jam between the opposed partition walls. In general, the spacing between adjacent partition panels 160 will exceed the axial dimension of bases being handled by about one-eighth to one-fourth of an inch. From the foregoing, it is believed apparent that the axial spacing between partition panels 160 is determined by the axial height of the bases being handled.

The axial dimension of a given base, as well as its diameter, are in turn determined by the dimension of the glass container upon which it is to be mounted. For 10 ounce and 12 ounce containers, the axial dimension of the respective base elements falls within the degree of tolerance allowable in the spacing of partition panels 160, and the storage cell system with minor adjustments can thus handle either bases for 10 or 12 ounce containers without requiring any change in spacing between adjacent partition panels 160. However, because of the variation in diameter between bases for 10 ounce containers and those employed with 12 ounce containers, minor modifications of the cell are required.

The width of the discharge opening at the bottom of the cell, through which the bases are dumped as the cell is being emptied is made relatively wide so that several bases can pass through the discharge opening simultaneously to provide for rapid emptying of the cell. The width of the discharge opening must be chosen to be such as to eliminate the possibility of a group of bases attempting to pass through the discharge opening in a pattern such that they become wedged into an arch which bridges the opening to prevent bases from leaving the cell.

To minimize the possibility of bridging or jamming the discharge opening, the width of the opening itself can be adjusted by mounting spacers, such as 238 of a selected length on the inner sides of stabilizer bars 198 to thereby regulate the width of the discharge opening. In addition to adjusting the width of the discharge opening by the use of spacers 238, sinuous base positioning strips 240 are fixedly secured to the upper surfaces of partition guides 194 to locate the bottom layer of bases in the cell in a pre-determined side-by-side relationship relative to the discharge opening. A different set of spacers 238 and locator bars 240 is provided to adapt the cell system to handle bases for 10 or 12 ounce containers.

In addition to establishing the pattern of bases within the cell relative to the discharge opening, the sinuous locator bars 240 also act to restrain those bases in the lower portion of the cell against horizontal movement toward the discharge opening to minimize horizontal forces tending to create a block or bridge across the discharge opening. Flipper bars 200 are elevated into the inclined position shown in broken line in FIGS. 22A, 22B during the final stages of emptying the cell to release the lower layer of bases from the restraining action of locator bars 240.

CELL UNLOADING MECHANISM

The cell unloading mechanism includes unloading carriage 60 and associated mechanism carried upon unloading carriage 60 for actuating gate rods 212 and flipper bars 200 of a cell 56 when unloading carriage 60 is operatively positioned beneath the cell.

Referring now particularly to FIGS. 22A and 22B, unloading carriage 60 includes a main frame member 250 which extends horizontally in a direction transversely of the path of movement of carriage 60. At one end of frame member 250, (FIG. 22B) a ball nut housing 252 is fixedly secured to frame member 250 and threadably receives a ball screw 254. A carriage mount 256 is fixedly secured to the lower side of ball nut housing 252 and extends in a horizontal direction perpendicular to the extent of frame member 250 to support at each end a set of support rollers 258 which are mounted to roll along the circumference of a cylindrical main support rail 260 fixedly supported upon the stationary machine frame. At the opposite end of frame member 260 (FIG. 22A) a mounting bracket 262 fixedly secured to frame member 250 rotatively supports front and rear pairs of support rollers 264, each pair of rollers 264 respectively engaging the upper and lower surfaces of a plate-like track 266 fixedly mounted upon the machine frame. Track 266 and cylindrical guide rail 260 extend horizontally beneath the storage cell assembly in a direction perpendicular to the cell partitions and support the unloading carriage for horizontal movement from one end of the cell assembly to the other. Ball screw 254 is rotatably supported in fixedly located bearings beyond the respective opposite ends of the cell assembly as at 268 (FIG. 8) and is driven in rotation by a reversible drive motor 270 to position unloading carriage 60 at selected positions along its path of movement. As was the case with loading carriage 58, drive motor 270 is under the control of a numerical positioning control system in which alignment of the carriage with a selected cell is accomplished by rotating ball screw 254 to a particular angular position corresponding to the cell position.

Shifting of cell gate rods 212 to their open position is accomplished under the control of a pair of cable cylinders 272 respectively mounted at opposite ends of carriage frame member 250. As best seen in the cross sectional view of the cylinder 272 in FIG. 22A, cylinders 272 have an internal piston 274 to which the opposite ends of a flexible cable 276 are secured to form the cable into an endless loop. Cable 276 passes through the end caps 278, 280 in the same fashion as would a conventional piston rod, and the projecting portions of the cable are then respectively trained around freely rotatable pulleys 282 and 284 rotatably supported in mounting brackets 286 fixedly mounted on the carriage frame. A slide block 288 is slidably mounted upon a guide track 290 which is fixedly secured on mounting brackets 286. Slide block 288 is fixedly clamped, as by a set screw 292 to that run 294 of cable 276 which extends between pulleys 282 and 284 at the exterior of cylinder 272. It is believed apparant the shifting of piston 274 from one end to the other of cylinder 272 will drive cable 276 to pull slide block 288 to one or the other of the end limits of travel established by guide track 290.

At its upper side, slide block 288 carries an actuating lug 296. When slide block 288 is in its normal unactuated position lug 296 upon movement of the unloading carriage moves in a path aligned with the slots 216 in the bottom of gate rod actuating blocks 214 and will pass freely through these various notches as the carriage moves. When the unloading carriage is operatively positioned in alignment with a selected cell, actuating lug 296 is located between the opposite walls of the slot 216 in the actuating block attached to the gate rod of the aligned cell. With the carriage in the desired position, air is supplied simultaneously to the two cable cylinders 272 to shift their respective positions in a direction driving the associated actuating blocks and their lugs 296 outwardly to retract the gate rods 212 clear of the cell discharge opening. Air under pressure is supplied simultaneously to the two cylinders 272 under the control of a solenoid actuated four way reversing valve connected in a conventional manner to the two cylinders.

Shifting of flipper bars 200 between their normally maintained horizontal position and their elevated inclined position is accomplished by a pair of conventional pneumatic motors 300 respectively mounted in vertical positions at opposite sides of carriage 60. The piston rods 302 of motors 300 each carry a disc 304 which is engageable within the notch 236 of the actuating block 234 carried on the flipper bar operating rod 226. When the piston rod 302 of motor 300 is in its fully retracted position illustrated in full line in FIGS. 22A, 22B, the disc 304 carried by the rod is supported at an elevation such that it will pass freely through the notches 236 of blocks 234 carried by the operating rods 226 as the carriage moves along its path. When the carriage is positioned in alignment with the desired cell, actuation of the motors 300 to extend their piston rods causes the disc 304 to drive the aligned operating rods 226 upwardly, thus swinging the flipper bars upwardly about their pivots 202.

Actuation of motors 300 is under the control of a conventional solenoid actuated four-way reversing valve 306 carried on main frame member 250 of the unloading carriage. Air under pressure is supplied to the respective control valves for cable cylinders 272 and flipper bar operating motors 300 by means of a coiled flexible conduit connected at one end to a stationary air supply source at one end of the cell assembly and connected at its opposite end to a suitably located fitting carried on carriage 60. This arrangement is similar to that employed in connection with loading carriage 58 and thus has not been illustrated. A similar arrangement, not shown, is employed to support and connect an electric power cable to the carriage to electrically connect various limit switches such as 314 and 316 into the electrical control circuit for the system described below.

Figure 23:
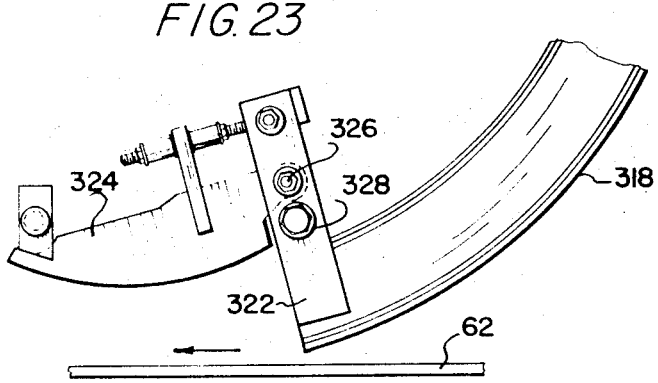
FIG. 23 is a detail side elevational view of the discharge chute of the loading carriage.

Bases discharged from a storage cell pass from the storage cell into the inlet opening of a curved chute 318 (FIG. 23) carried by and fixedly mounted upon main frame member 250 of the unloading carriage. As best seen in FIGS. 22A, 22B, the inlet opening 320 of chute 318 is in general coextensive with the cell discharge opening and is so located upon carriage 60 as to be in underlying vertical alignment with the cell discharge opening when the carriage is in position. The chute is curved smoothly through approximately 90° to deposit the bases in a normal upright orientation upon the horizontally extending upper run of discharge conveyor 62 which, during the emptying of a cell, is driven to convey bases away from the discharge opening 322 of chute 318. Because the bases are discharged from the cell and through chute 318 by gravity, the fairly substantial head of bases in the storage cell tends to discharge the first group of bases rapidly from the discharge opening 322 of the chute. To maintain these initially discharged bases in their proper orientation upon the belt of conveyor 62, a part retaining shoe 324 is pivotably mounted as at 326 on a pair of support brackets 328 mounted at opposite sides of the chute discharge opening 322. Shoe 324 acts as a sort of restricted orifice at the chute outlet to prevent the first discharged bases from skidding along the belt of conveyor 62. Once a sufficient number of bases have been discharged onto the belt of conveyor 62, the frictional grip between the bases and the belt is sufficient to restrain the column of bases extending back up through the chute and into the cell from being discharged at a velocity greater than that of the velocity of movement of the belt of conveyor 62.

The bases are conveyed by conveyor 62 in a column of several bases in width. At the discharge end of conveyor 62, the bases are discharged onto a single liner of more or less conventional construction which feeds the bases into a single line for conveyence in an oriented position to demand accumulator 66.

Figure 27:
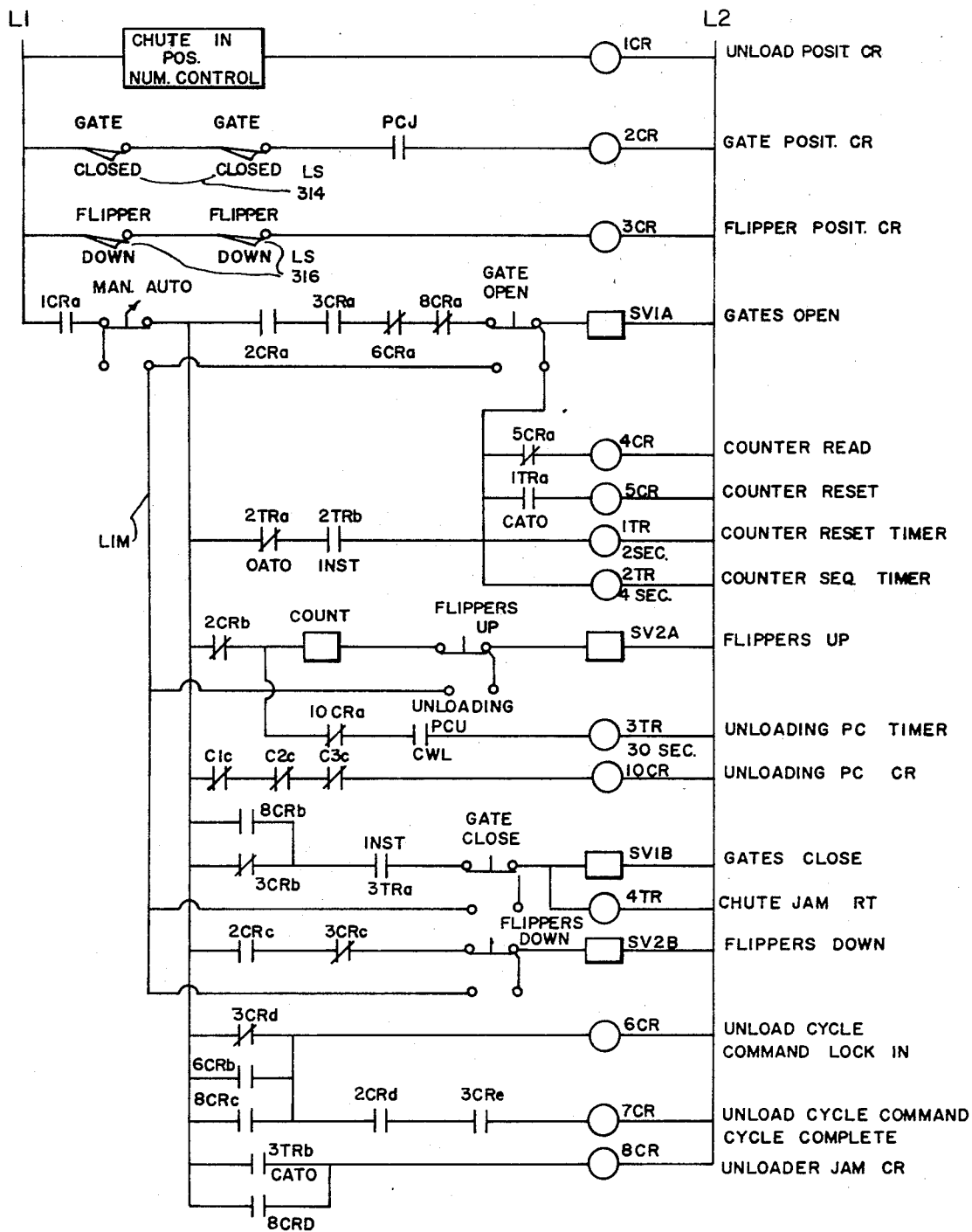
FIG. 27 is a simplified schematic electrical diagram of an electrical control circuit employed in connection with the unloading of bases from the storage cells.

A simplified electrical schematic diagram of the control circuit for the control of unloading the cells is shown in FIG. 27.

In the uppermost branch of the diagram is an unloading position control relay 1CR which is in effect a master control relay for either manual or automatically controlled unloading. This master relay 1CR is energized by the numerical positioning control system which positions the unloading chute 318 in alignment with the cell which has been selected to be unloaded. As previously stated, the numerical positioning control system is a commercially available system manufactured by Allen-Bradley Co. of Milwaukee, Wisconsin. When the unloading chute is in alignment with the desired cell, a circuit is completed across master relay 1CR by the numerical positioning control system to thereby close normally opened contacts 1CRa.

The control system may be set for either manual or automatic operation by selectively positioning the MAN-AUTO switch immediately to the left of contacts 1CRa, this switch being shown in the AUTO position in FIG. 27.

With the unloading carriage in position and its chute aligned with the selected cell, the respective gate drive motors 272 and flipper bar operating motors 300 are in the gate closed and flipper bar down positions respectively, as shown in full line in FIG. 22A, 22B this situation being detected by limit switches 314 and 316. Before proceeding with unloading, it is desired to check to make sure that the unloading chute is clear — i. e. not jammed, and this is done by a chute jam photocell whose contacts PCJ of FIG. 27 are closed when exposed to light. If both halves of the cell gate are closed (as represented by the respective positions of the two gate motors 272 which control the opposite sides of the gate) the two limit switch contacts LS314 will be closed, as will contacts PCJ if the chute is clear, to thereby energize the gate position control relay 2CR of FIG. 27. With the flipper bar operating drive motors in the flipper bar down position, the two limit switch contacts LS316 will be closed to energize the flipper bar position control relay 3CR.

With the foregoing conditions, and the circuits set as indicated on AUTO, solenoid SV1A will be energized by contacts 2CRa, 3CRa and normally closed contacts 6CRa and 8CRa and the normally closed GATE OPEN jog switch. Energization of solenoid SV1A supplies air under pressure to gate control motors 272 to drive these motors in a direction opening the gates to thereby start the discharge of bases from the cell. Concurrently with the energization of solenoid SV1A relays 1TR and 2TR are energized to initiate a counter reading and reset operation. Relay 1TR has a 2 second delay setting, while relay 2TR has a four second delay setting. Simultaneously with the energization of solenoid SV1A, relay 4CR is energized via normal closed contacts 5CRa while at the same time timing relays 1TR and 2TR are also energized. Energization of relay 4CR triggers a circuit, not shown, which transmitts the reading of a counter which counts the number of bases discharged from a cell to the computer. The counter reading which is transmitted by energization of relay 4CR is the number of bases discharged from the last previous cell which was unloaded. Relay 1TR, when energized, causes a two second delayed closing of contacts 1TRa which, upon closing, energize relay 5CR to reset the counter to zero. When relay 5CR is energized, contacts 5CRa open to de-energize counter read relay 4CR.

Energization of solenoid SV1A and relays 4CR, 5CR, 1TR and 2TR is accomplished by either of two parallel circuit branches, the uppermost one including the manually actuated "GATE OPEN" switch and normal closed command relay contacts 6CRa, and the alternative branch line including contacts 2TR*a* and 2TR*b* in series.

As previously stated, energization of solenoid SV1A causes the cell gates to be driven to their open position, thus opening the "GATE CLOSED" limit switches LS314 to de-energize relay 2CR. De-energization of relay 2CR opens its normal open contacts 2CR*a*, thus opening the first of the two circuit branches to solenoid SV1A, etc. This branch, however, remains energized for the four second setting of relay 2TR, contacts 2TR*b* closing instantly upon energization of relay 2TR, while the normal closed contacts 2TR*a* are delayed in opening for 4 seconds after relay 2TR is energized to thereby achieve a 4 second energization of the circuitry including relays 4CR and 5CR. The first two seconds of this time period result in the energization of relay 4CR to accomplish the counter reading as explained above, while the last 2 seconds of the 4 second time period are employed for the counter reset. The counter is preset to close a set of contacts after a predetermined number of bases have been discharged from the cell to raise the flipper bars to assist in emptying the last group of bases from the cell.

The flippers are elevated by energizing solenoid SV2A which is energized via contacts 2CR*b*, which are closed upon de-energization of relay 2CR when the gates are opened, the counter controlled contacts and the normally closed manually operated FLIPPERS UP switch. Elevation of the flipper bars may be accomplished at any time after a sufficient number of bases have been discharged from the cell to vacate a sufficient amount of space within the cell to permit the flipper bars to be raised without crushing the bases against the top of the cell.

Once unloading of a cell is commenced, it is desired to continue unloading the cell until it is completely empty. As explained in connection with the description set forth below of the operation of the drive motor of unloading conveyor 62, the unloading conveyor may be operated at any one of three different speed settings, or may be stopped during unloading of a cell in the event the demand accumulator 66 is full. Stopping of conveyor 62 during the unloading of a cell merely holds all the bases in their present position, the bases on the belt of conveyor 62 stopping with the belt and thus preventing further flow of bases from the discharge chute and cell. Stoppage of conveyor belt 62 occurs only when demand accumulator 66 is filled, and at this time filling of demand accumulator 66 causes bases to back up through the conveyor line, single liner 64 and on belt 62.

Because of the substantial length of conveyor 62, there is a distinct possibility that demand accumulator 66 may become filled at a point in time after a cell has been completely emptied, but before all of the bases discharge from that cell have been conveyed clear of conveyor 62. Because the unloading chute and carriage must be free to move anywhere above the surface of conveyor 62 to the next cell to be unloaded, it is not desired to shift the unloading carriage to a new cell position until after the conveying run of conveyor 62 has been completely cleared of bases and conveyor 62 is being driven, thus indicating a demand for bases at demand accumulator 66.

The desired interlock is accomplished by control relay 10CR and a photocell controlled timing relay 3TR. Control relay 10CR is controlled by three normally closed contacts in series, C1*c*, C2*c* and C3*c*, these three contacts being in turn controlled by the respective motor control circuits C1, C2 and C3 respectively described in connection with the description of the operation of the unloading conveyor motor control. Because the conveyor of motor 62 is operating when any one of circuits C1, C2 and C3 are energized, it is apparent that relay 10CR is energized only when the belt of conveyor 62 is stopped.

When the belt stops, with the cell gates open, thus closing contacts 2CR*b*, contacts 10CR*a* will open, thus blocking completion of a circuit through timing relay 3TR whose energizing circuit also includes a set of photocell operating contacts PCU which are closed when lit. Photocell PCU is actuated by a beam of light directed across the discharge end of conveyor 62. While this light beam will normally be blocked by bases or conveyor 62, there is a possibility that light may intermittently strike the photocell due to minor gaps or interruptions in the flow of bases. Relay contacts 10CR*a* prevent the possibility of energization of relay 3TR, should conveyor belt 62 be stopped at a point in time where there might be a gap in the flow of bases along conveyor 62 which would permit energizing light to strike photocell PCU.

Assuming that the flow of bases from conveyor 62 to demand accumulator 66 continues, the storage cell will eventually be completely emptied, and with the belt of conveyor 62 running, eventually the last base from the cell will clear photocell PCU to energize relay 3TR. When relay 3TR is energized, contacts 3TR*a* are instantaneously closed to energize the gate closing solenoid SV1D via normal closed contacts 3CR*b* and the manually actuated "gate close" contacts, contacts 3CR*b* being closed at this time because the flipper bars are up, thus de-energizing relay 3CR. As soon as the gates close, limit switch contacts LS314 are closed to thereby close contacts 2CR*c* which, via contacts 3CR*c*, close because the flipper bars are up, and the closed manual FLIPPERS DOWN switch to energize the flipper down driving solenoid SV2B. When the flipper bars arrive in their down position, limit switch contacts LS316 are closed to energize relay 3CR, thereby opening contacts 3CR*d* and 3CR*c* to de-energize the gate closing solenoid SV1B and the flipper down solenoid SV2B. In the event that the gate closing solenoid SV1D is not de-energized within a predetermined period of time, an alarm relay 4TR, connected in parallel with solenoid SV1B closes a set of contacts, not shown, to sound a chute jam alarm, indicating that bases are jammed within the unloading chute. This jam may be detected by the chute jam photocell PCJ, actuated by a beam of light directed across the chute and which, when dark, maintains contacts PCJ open to prevent closing of the gate. In the event the chute jam is not within the path of the controlling light beam of photocell PCJ, the jam may exist in a location which physically prevents the closing of the gates. In either event, solenoid SV1B and timing relay 4TR will remain energized for a sufficient time to cause 4TR to sound the alarm.

At the time the flipper bars were elevated during the cell unloading process, elevation of the flipper bars de-energized relay 3CR, thereby causing contacts 3CRd to close to complete a circuit through a cycle command lock in relay 6CR, this latter relay immediately locking itself in energized condition by closure of its controlled contacts 6CRd. Closure of relay 6CR opened contacts 6CRa in the gate opening energizing circuit to relay solenoid SV1A, to thereby prevent subsequent opening of the gates at the completion of the gate closing and flipper bar lowering cycle which would cause consequent closure of contacts 2CRa and 3CRa. When the gate is closed and the flipper bars are lowered at the conclusion of the unloading cycle, contacts 2CRd and 3CRe are closed to energize a cycle completion command relay 7CR via lock in contact 6CRd. Relay 7CR, when energized, transmits a signal to the computer, by a circuit not shown, to signal the computer that the unloading cycle of this particular cell is complete to thereby order the computer to select the next cell to be unloaded and to start to move the unloading carriage towards the newly selected cell. As the unloading carriage begins to move from its alignment with the completely unloaded cell, the numerical position control de-energizes master relay 1CR, thereby opening contacts 1CRa to prevent energization of the various cycle control relays.

The circuit also includes an unloader jam control relay 8CR which is initially energized by delayed opening contacts 3CRb controlled by relay 3TR, contacts 3TRb closing upon a thirty second energization of relay 3TR. As described above, the cell gates must be open to close contacts 3CRb, and the conveyor belt must be running to close contacts 10CRa before the light beam can energize unloading conveyor photocell contacts PCU to energize relay 3TR. Thus, if relay 3TR is energized for 30 seconds while the cell gates are open and unloading conveyor 62 is running, there is evidence of a jam in the chute, because the 30 second delay would permit bases to be conveyed by conveyor 62 at slow speed from the most distant point from the discharge end.

Energization of relay 3TR for 30 seconds closes contacts 3TRb to energize control relay 8CR, which immediately locks itself in via contacts 8CRd.

The foregoing description has been in terms of automatic operation of the unloading cycle. If desired, unloading of a cell can be under manual control, in which case the MAN-AUTO switch is shifted from the illustrated position to the manual position to connect supply line L1 to conductor L1M. With line L1M thus energized, the gate and flipper control solenoids may be actuated at will by manual manipulation of the manually actuated switches connected into their respective circuits.

STORAGE CELL ASSEMBLY CONTROL

Loading and unloading of storage cells 56 is under the control of a Control Data Corporation Model 1700 computer. The control functions which the computer is required to perform are of a relatively simple nature, being basically those of maintaining an inventory. Because the programming of an existing computer or the selection of appropriate commercially available circuit modules, magnetic memory units, to perform the desired functions is well within the capabilities of those skilled in the computer field, the computer is described below only in terms of the functions which it performs.

In a typical installation, the base storage system described above will employ some 60 individual storage cells 56 to supply bases to the glass line at rates of up to 600 bases per minute. To accommodate shifting of the base storage system from supplying bases bearing a first label to the supply of bases bearing a second label, the storage system and computer are programmed so that the storage cell system can handle bases bearing two different labels. The Control Data Corporation Model 1700 computer has the capability of handling more than two types of labels at a time, however, this description will speak only in terms of two different labels. The system will operate to supply only bases bearing labels of one type continuously, however because the glass line runs continuously, when the production schedule calls for the shifting from one label type to another, bases bearing labels of the new type must be stored in the cells while the cell system is still supplying the glass line with the final group of bases bearing the first label.

Each cell, when filled, will hold approximately 1,800 bases, and thus a single cell is capable of furnishing a three minute supply of bases to the glass line at the 600 container per minute rate. Approximately 90 seconds is required to fill or to unload a cell; the speed of movement of the loading and unloading carriages is such that either carriage can travel from one end of the storage cell assembly to the other in 15 seconds.

The primary function of the computer is to store certain information relating to the present status of each of the individual cells 56 and, upon the basis of this information to determine which cell is to be next loaded or unloaded. After making this last determination, the computer then transmits the appropriate signal to the numerical positioning control system of the appropriate carriage motor.

Figure 25:
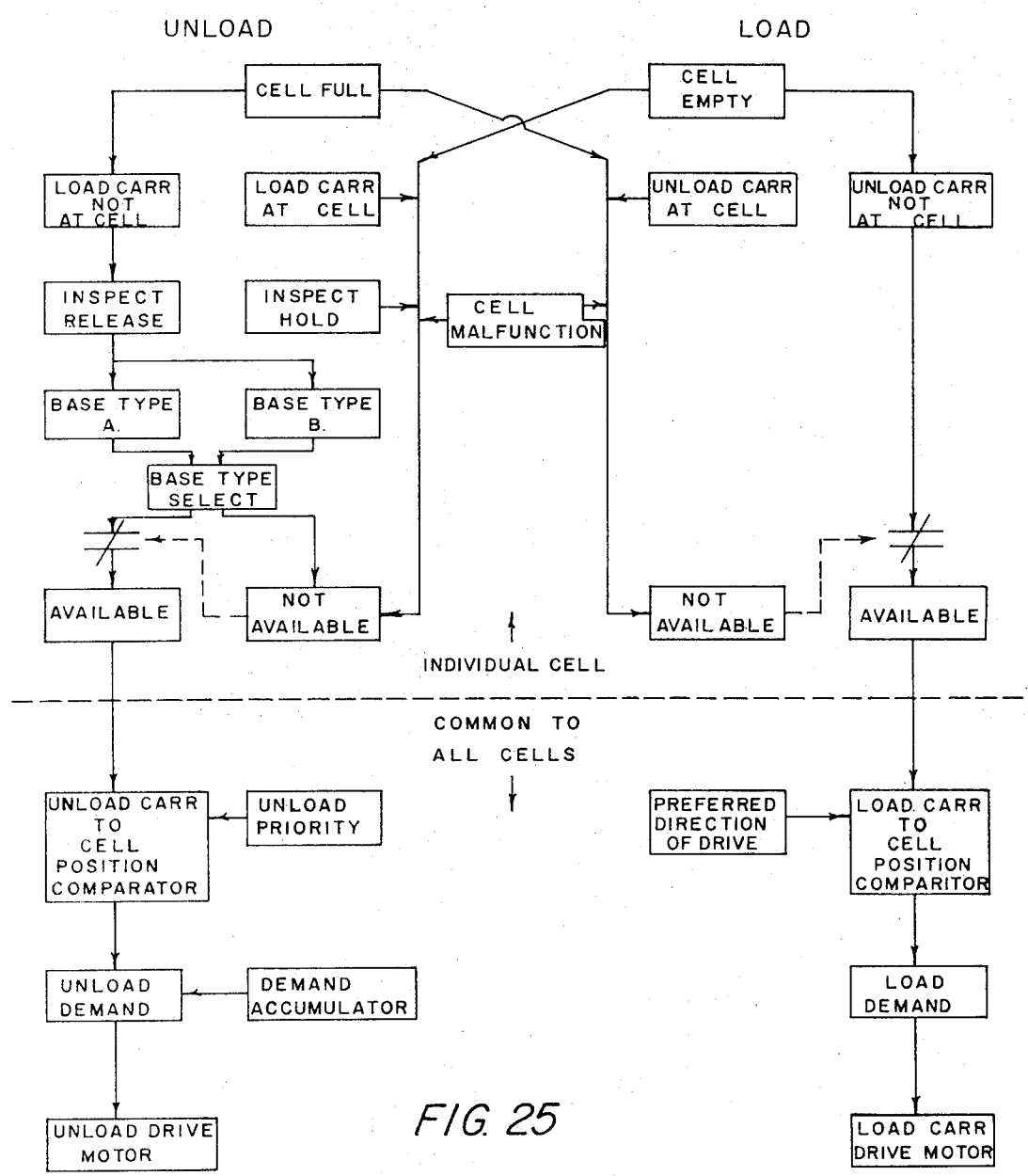
FIG. 25 is a schematic diagram illustrating certain computer control functions associated with the loading and unloading of the storage cells of the system of FIG. 1.

Information which is received and stored by the computer is set forth in block diagram form in FIG. 25. Information stored by the computer for each of the individual cells is set forth above the broken line of FIG. 25, while information common to all cells is schematically indicated below the broken line. The information which the computer must consider in determining whether a cell is or is not available for loading differs from the information considered in determining whether or not a cell is available for unloading.

Except during that period of time when an individual cell is in the process of being loaded or unloaded, the individual cell will be in one of 3 possible states. It may be full of bases; it may be empty; or it may have a malfunction. The usual malfunction occurs when a cell inlet or outlet becomes jammed with the result that the cell is partially filled with bases. The system is programmed so that once loading of a cell is commenced, loading is continued until the cell is completely filled, and conversely once emptying of a cell is commenced, it is continued until the cell is completely emptied. Thus, for each individual cell, the computer maintains at all times in its memory the status of that individual cell, namely whether the cell is: (1) full; (2) empty; or (3) the cell has a malfunction. It should be noted that while jamming of a cell inlet or outlet is probably the most common cause of malfunction, the computer may record a cell as having a malfunction for other reasons — i. e. failure of one or both gate rods to return to the fully closed position.

In determining which cell is to be next loaded, the computer first makes a determination as to what cells are available for loading. In the diagram of FIG. 25, on the right hand side of the diagram, which is concerned with the determination of the next cell to be loaded, immediately above the dotted line are shown two boxes, one labeled NOT AVAILABLE and one labeled AVAILABLE. These two boxes are intended to indicate that for each individual cell, the computer at all times maintains an indication as to whether that individual cell is or is not available for loading purposes. The cell is not available for loading if the cell is already filled or if the cell has a malfunction. In the diagram of FIG. 25, this is indicated by the lines extending from the CELL FULL block (upper left hand corner of FIG. 25) and the CELL MALFUNCTION block (upper center of FIG. 25) which feed into the NOT AVAILABLE for loading block. In the event of either of these two occurrences, the cell is not available for loading and the existence of either of these two conditions making the cell not available must override a signal that the cell is available, as indicated by the broken line extending from the NOT AVAILABLE block to a set of normally closed contacts immediately above the AVAILABLE block.

A third condition in which it is desired to withhold a cell from being available for loading is the case when the unloading carriage is positioned beneath that particular cell. In the diagram of FIG. 25, this third condition is indicated by the block designated UNLOAD CARRIAGE AT CELL feeding the NOT AVAILABLE for loading block.

Apart from the three foregoing conditions, the only criteria in determining that a cell is available for loading is the fact that the cell is empty in which event it is recorded the the computer as being available for loading.

After scanning its memory to determine which of the cells are available for loading, the computer then makes a determination as to which of the available cells is closest to the present position of the loading carriage. In making this determination, the computer is programmed to load the cells in sequence, insofar as is possible, toward one end of the cell assembly.

Normally, loading of the cells will continue until all empty cells have been filled. However, in some circumstances it may be desired, for any of several reasons, not to load an available empty cell, and thus the signal to the load carriage drive motor is not transmitted until it is determined whether or not there is a load demand. One example of such a situation might be the case where the base supply line upstream of the cell system contained more bases of a given type of label than were needed to complete the production run of that particular type of label. In this event, it would not be desired to load the surplus bases into the cells.

In determining which cell is to be next unloaded, the status of the individual cells is examined by the computer in the same manner as in making the loading determination. As was true in the case of loading, the computer will exclude from availability for unloading that particular cell at which the loading carriage is located.

In addition to the comparable determinations made in making the loading determination, two other factors are considered by the computer for the unloading of each individual cell. The first of these is concerned with the quality of the decoration or label applied to the bases contained in the cell. As will be described in more detail below, the quality of the label applied to the bases is inspected periodically at a location upstream from the cell system. The time period between successive inspections is such that it is greater than the period of time required for a base to travel from the inspection station into the cells during normal operation of the system. Quality defects in the labeling of the bases tend to occur progressively, as by blurring or a color change in the labeling ink, and hence upon the detection of a substandard label, all bases which have passed the inspection station since the last previous inspection are automatically considered substandard.

After making his inspection, the inspector signals the result to the computer by pressing either a "GOOD" button or a "BAD" button. The computer is programmed to apply a hold signal to all cells as they are filled until it receives a "GOOD" signal from the inspector. Upon the receipt of this signal, the computer releases its hold on any cells which may have been filled since the last previous inspection. The computer automatically determines the time delay required for a base to travel from the inspection station to the cells to release those cells subsequently filled with bases in the line between the inspection station and the cells at the time of a "GOOD" inspection.

The second determination which the computer must make in determining whether or not a cell is available for unloading is whether or not the cell contains bases decorated with the desired label. This is indicated in the diagram of FIG. 25 by the blocks designated BASE TYPE A and BASE TYPE B.

After making its determination as to which cells are available for unloading, the computer then scans the cells which are available to determine which cell is located closest to the present position of the unloading carriage. Unlike the loading carriage, the unloading carriage has no preferred direction of drive and the computer will direct the unloading carriage to the closest cell available for loading, regardless of which direction of drive is required.

Among other records maintained by the computer is a record of the exact time at which a particular cell was loaded. This information may, if desired, be employed to establish an unloading priority for a particular cell after a predetermined period of time has elapsed since the cell has been loaded to prevent the situation where the bases may remain within a cell for an overly extended period of time.

As in the case with the loading cycle, after the computer has determined which cell is to be next unloaded, the command signal to the unloading carriage drive is held unless there is an unloading demand for additional bases in the demand accumulator. The unload demand is used much more frequently than is the "LOAD DEMAND" of the loading cycle in that the demand accumulator will request bases from the storage cells only when the supply of bases in the demand accumulator has dropped below a predetermined level.

STORAGE HOPPER CONVEYOR DRIVE CONTROL

Figure 29:
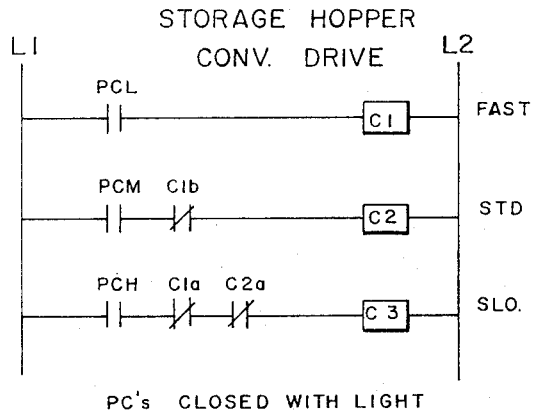
FIG. 29 is a schematic diagram of the storage hopper conveyor (62) drive system.

A simplified schematic diagram of the electrical control circuit for controlling operation of the motor which drives the storage hopper conveyor 62 is shown in FIG. 29. This circuit is operable to drive conveyor 62 selectively at a slow, standard, or high speed in accordance with the number of bases which are present in demand accumulator 66. The number of bases in demand accumulator 66 is sensed by a series of three photocells PCL, PCM and PCH located at three different levels on accumulator 66 (see FIG. 1). In the schematic diagram of FIG. 29, the contacts of these three photocells are indicated as being of the normal open type, which are closed on exposure to light, light to the individual photocells being blocked when the level of bases within accumulator 66 rises above the elevation of the particular photocell. In the electrical diagram of FIG. 29, the circuitry has been simplified by schematic representation of three motor speed control circuits C1, C2, and C3 which, when energized, will cause the drive motor of conveyor 62 to respectively drive at high, standard or low speed.

Assuming that demand accumulator 66 is filled with bases to a level above the uppermost of the three photocells PCH, none of the three motor control circuits C1, C2 or C3 of FIG. 29 will be energized because all three of the photocells will be dark. As bases are withdrawn from demand accumulator 66, the level of bases within the accumulator drops and eventually the uppermost photocell PCH is exposed to its light source, thus closing contacts PCH of the circuit of FIG. 29 which completes a circuit across supply lines L1 and L2 through motor control circuit C3 via the two normally closed contacts C1 and C2, respectively controlled by motor control circuits C1 and C2. Energization of motor control circuit C3 will cause the drive motor of conveyor 62 to drive at a slow speed.

Assuming that bases are being withdrawn from demand accumulator 66 at a rate greater than they are supplied by driving conveyor 62 at slow speed, the level of bases within demand accumulator 66 will continue to drop until the intermediate photocell PCM sees its light source. At this time, the contacts PCM of the diagram of FIG. 29 will close, to energize motor control circuit C2 via normal closed contacts C1b. Upon energization of motor control circuit C2, contacts C2a are opened to de-energize motor control circuit C3. Energization of motor control circuit C2 causes the drive motor of conveyor 62 to speed up to drive at standard speed.

Assuming that the number of bases supplied to the demand accumulator with conveyor 62 running at standard speed is still not enough to match the rate at which bases are being withdrawn from accumulator 66, the level of bases within accumulator 66 will continue to drop until the lowermost photocell PCL is exposed to its light source. This causes contacts PCL of FIG. 29 to close to energize motor control circuit C1 which causes the motor of conveyor 62 to drive at high speed. Energization of motor control circuit C1 opens contacts C1a and C1b of FIG. 29, thus preventing either of motor controls circuits C2 or C3 from being energized.

As the level of bases within the accumulator begins to rise, it eventually rises above the level of the lowermost photocell PCL and the bases thus block photocell PCL from its light source to open contact PCL of FIG. 29, de-energizing circuit C1. Because photocell PCM, as well as photocell PCH are still exposed to their respective light sources at this time, the de-energization of circuit C1 permits contacts C1b and C1a to close, thus energizing control circuit C2. Energization of circuit C2 opens contacts C2a to prevent circuit C3 from being energized.

Similarly when the level of bases in the accumulator rises above the level of the intermediate photocell PCM, contacts PCM of FIG. 29 open when the rising level of bases blocks the light source to PCM, thus closing contact C2a to energize motor control circuit C3.

Should the level of bases again arise above the uppermost photocell PCH, the light source of this latter photocell is blocked to de-energize motor control circuit C3, and thus stop conveyor 62.

INSPECTION SYSTEM

Inspection station 44 is located a substantial distance upstream from the storage cells. As previously explained, the inspection which is performed at this particular point is to ascertain whether or not the quality of the label applied to the bases at decorator 42 is satisfactory. Because, from time to time, different labels will be applied to the bases, and the features of the label which must be checked are many and varied, it is impractical to perform this inspection by a machine and the inspection is therefore performed visually by a human inspector. The inspector at times selected by the computer manually removes a base from the line, visually inspects the base, and then manually depresses one of two push buttons located at the inspection station. For convenience, these two push buttons are identified as a "GOOD" button and a "BAD" button and are employed by the inspector to register his opinion of the quality of the decoration of the base which he has just inspected.

Substantially all of the defects which might be present in a label are of the type which grow progressively worse, as for example smears or holidays involving the printed portion of the label, color changes or variation in quantity of the ink supplied, etc. When the inspector detects a defect in the label, it is assumed that all bases which have passed the inspection station since the last satisfactory inspection are defective and it is desired to prevent any of these last group of bases which have been already loaded into a storage cell from being discharged from the cell. Further, a second group of bases likewise assumed to be defective will be in the line between the inspection station and the storage cells, and because the base production machines 40 run continuously, bases will continue to flow to and past the inspection station to the cells and it is desired to prevent this latter group of bases from being discharged from the cells until the decorator has been adjusted to eliminate the defect in the decoration.

The results of the inspection are transmitted to the computer which maintains in its memory bank an inventory of those cells which are filled with bases having satisfactory labels and also an inventory of those cells into which bases having a substandard decoration or label have been loaded. The computer maintains this latter group of cells in the status of being unavailable for unloading.

Figure 28:
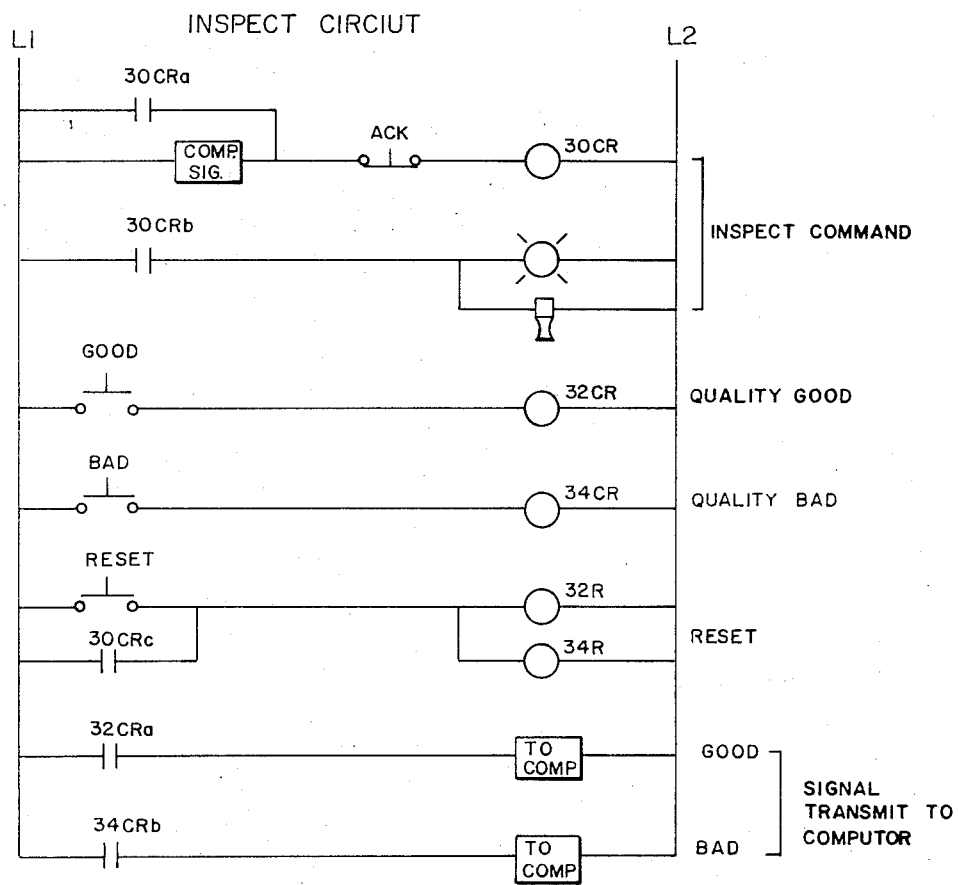
FIG. 28 is a schematic electrical diagram of a control circuit employed in connection with the inspection of bases handled by the system of FIG. 1.

The electrical control circuit of the inspection system is shown schematically in FIG. 28. The time period between successive inspections is determined by the computer in accordance with the rate of flow of bases through the system. When the computer determines that it is time to conduct an inspection, the computer transmits a computer signal to the circuit of FIG. 28 which energizes an inspect command control relay 30CR which immediately locks itself in by closing its contacts 30CRa. Contacts 30CRb also close upon the energization of relay 30CR to complete a circuit through a light and horn to both visibly and audibly notify the inspector that it is time to make an inspection.

The inspector acknowledges receipt of this instruction by manually depressing an acknowledge push button ACK which opens the circuit to relay 30CR, thus shutting off the light and horn. The inspector then removes a sample base from the line, inspects the base, and then presses either a GOOD or BAD push button to signal the results of his inspection.

Depression of the GOOD button energizes relay 32CR which closes a set of contacts 32CRa to transmit to the computer a signal indicating a satisfactory inspection. Depression of the BAD push button energizes relay 34CR which closes a set of contacts 34CRa to transmit to the computer a signal indicating an unsatisfactory inspection.

Relays 32CR and 34CR are of a self-latching type and will maintain their controlled contacts in their relay energized condition even upon subsequent de-energization of relay 32CR or 34CR. To restore the controlled contacts 32CRa or 34CRa to their normal open position after energization of their corresponding relay, it is necessary to reset the relay.

During periods of normal operation — i.e., successive satisfactory inspections, resetting of the relay is automatically accomplished by the closure of contacts 30CRc which close each time relay 30CR is energized by an inspect command signal from the computer.

In the case where a base inspected is unsatisfactory, the transmission of the unsatisfactory inspection signal to the computer will cause the computer to render unavailable for loading all of those cells which contain in whole or in part any base which has been fed into the cell which has passed the inspection station since the last GOOD inspection signal has been received by the computer. Loading of the cells is continued, regardless of the result of the inspection, with the computer keeping track of those cells into which bases with substandard quality decorations are loaded and maintaining these cells unavailable for normal unloading to the assembly station.

After signalling an unsatisfactory inspection, the inspector will take appropriate action to have the fault corrected and, upon correction of the fault will begin to make frequent inspections without waiting for the computer signal to determine when the first satisfactory bases reach the inspection station. As soon as satisfactory bases begin to reach the station, the inspector will manually depress the reset push button to reset the latch control relay 34CR and will then depress the GOOD push button to signal the computer that good quality decorated labels are now flowing past the inspection station. The computer continues to hold as unavailable for loading cells which are being loaded at this time and will hold as unavailable for loading any cells fully or partially loaded between the time at which the good inspection signal is received and the time at which the first bases which have passed the inspection station subsequent to the good inspection signal begin to arrive at the cells.

Cells containing bases with substandard quality decorations are unloaded during shut down periods under manual control.

SUMMARY OF OPERATION

The basic function of the supply system described in detail above is to enable the merger of two independently operated production lines so that parts produced on one of the lines are fed to and available at the point of merger in accordance with the rate of flow of the parts on the other line to the merger point. In the specific example described above, the glass line may be considered a main production line with the base supply system being thought of in terms of a branch line which is required to supply bases to the assembly station in exact accordance with the rate of movement of glass containers to the assembly station. Thus, during normal operation, the glass line is set to operate at a substantially constant number of containers per minute, the containers being conveyed to the point at which the base is assembled upon the container in a single line of containers carried in uniformly spaced pockets on the assembly machine — see copending application of Mallory et al., Serial No. 883,515.

While the glass line moves continuously at a constant rate of speed, the number of containers passing the point of assembly with the base element per minutes may vary in a random and unpredictable manner due to the ejection of substandard containers from the glass line at points upstream from the assembly station. The gaps created in the glass line by the ejection of substandard containers may take the form of either a gap of a single container resulting from some minor deviation from standards due to some randomly occurring flaw such as a pin hole or, on the other hand, may take the form of the continuous ejection of a substantial number of successive containers due to a malfunction in one of the forming steps which might, for example, result in an improperly formed finish on the containers.

The effect of these gaps in the glass line at the point of assembly is nullified by employing the glass container to strip the end most base from the discharge end of the base supply line by the passage of the container through the assembly station as best seen in FIG. 24. In this manner, bases are removed from the assembly point only by the passage of a glass container and the flow of bases from the end of the base supply line is automatically regulated by the glass container line.

Automatic feeding of bases to the discharge end of base supply chute 70 to be stripped and assembled upon the passing glass containers is accomplished by the gravitational forces supplemented by air jets acting on the line of bases maintained in the inclined supply chute 70. The supply of bases in chute 70 is in turn maintained by demand accumulator 66 whose primary function is to assure that at least the inclined chute 70 is filled with bases at all times.

Demand accumulator 66 is in turn replenished from the storage cell system form which demand accumulator 66 can withdraw bases as required to maintained a minimum number of bases available at all times within the demand accumulator. The capacity of demand accumulator 66 is sufficient to continue the supply of bases to assembly machine 72 during those time periods of interruption of the supply of bases from storage cells 56 while unloading carriage 60 is being shifted from an empty storage cell 56 to the next cell 56 to be unloaded. As explained above, the time interval during which the supply of bases from cells 56 to demand accumulator 66 is kept at a minimum by programming the computer so that unloading carriage 66, upon the completion of emptying a given storage cell 56, is driven to the closest storage cell filled with the desired type of base. The unloading carriage drive is operable to move the unloading carriage from one end of the bank of cells 56 to the opposite ends in approximately 15 seconds, while the individual storage cells 56 and demand accumulator 66 each have a capacity of approximately 1,800 bases representing a 3 minute supply to the glass line when the glass line is running at 600 containers per minute.

Demand accumulator 66 is similar in construction to an individual cell 56 in that it stores bases in a vertically disposed layer, a single base in thickness. Structurally demand accumulator 66 differs from a cell 56 in that its outlet is permanently open and its bottom walls are inclined toward the outlet which is operable to release a single base at a time into a single line conveying system which transports the bases to the assembly machine supply chute 70. Demand accumulator 66 withdraws bases from the storage cells in accordance with the number or level of bases stored within the accumulator. Three level sensing switches at a high, intermediate and low elevation along the vertical side of accumulator 66 detect the level of bases within the accumulator. When the level of bases rises above the highest level sensing switch, belt conveyor 62, which receives bases from storage cells 56 is stopped and the supply of bases to demand accumulator 66 is discontinued until the level of bases within accumulator 66 falls below the level of the uppermost level sensing switch. When this occurs, belt conveyor 62 is restarted and runs at a low speed, with unloading carriage 60 being shifted from cell to cell as the cells are emptied. In the event the level of bases within demand accumulator 66 should fall below the level of the intermediate sensing switch, the drive of belt conveyor 62 is shifted to drive at a standard speed until the supply of bases within demand accumulator 66 has been built back up to the level of the intermediate level sensing switch; whereupon the drive of belt conveyor 62 is shifted to low speed. If, however, the level of bases within demand accumulator 66 falls below the level of the lowermost sensing switch, the belt conveyor 62 drive is shifted to drive at a higher speed than standard speed. In the demand accumulator 66 the just described control system includes three level sensing switches that function through three speed gradients plus stop.

Unloading of the bases from the individual cells 56 is under control of mechanism carried by the unloading carriage 60. Upon arrival of unloading carriage in operative relationship beneath a filled cell 56, air under pressure is supplied to cable cylinders 272 to retract the gate rods 212 to their open position to thereby gravitationally release bases from the cell. Bases released from the cell pass downwardly through the unloading chute 318 and onto the upper run of belt conveyor 62. The initial surge of bases flowing from chute 318 is retarded by shoe 324 at the chute discharge opening to prevent these initially discharged bases from flipping over on the conveyor 62. The flow of bases from the cell is timed and after a selected number of bases have been discharged from the cell pneumatic motors 300 on carriage 60 are actuated to shift flipper bars 200 to their upwardly inclined position to discharge the final bases from the cell.

Emptying of the cell, when completed, shifts the four-way reversing valves controlling cable cylinders 272 and motors 300 to restore the respective pistons to their original position, thereby returning flipper bars 200 and gate rods 212 to their original positions. Arrival of the flipper bars and gate rods at their normal positions is registered by suitably located limit switches which are operable, when depressed, to signal the computer that unloading carriage 60 may be driven to the next cell position to be unloaded.

As explained above, the computer maintains an inventory of the status of all of cells 56 at a given time, the inventory including the status of the cell — that is whether it is filled or empty (or malfunctioning), and if filled, the particular type of label contained in the cell. When unloading of one cell is completed, the computer then locates the closest cell filled with bases of the desired type and signals the unloading carriage drive to shift unloading carriage 60 to this particular cell, at which the unloading cycle described above is repeated.

Loading of the cells is accomplished by feeding bases along one or more belt conveyors extending transversely across and above the bank of storage cells. A loading carriage 58 is moveable along the conveyor and equipped with two chutes which receive bases from the conveyor and transfers them to inlet openings at the upper end of a selected cell aligned with the loading carriage. The bases drop gravitationally into the cell and eventually fill the cell. Filling of the cell is signaled by a combination of a timing mechanism and an electric eye counter at the belt inlets. A gate 52 at the inlet end of each conveyor 54 is controlled by an electric interlock to automatically close while the loading carriage is being shifted from cell to cell. Shifting of the loading carriage is likewise under the control of the computer, however, the cells will normally be loaded in sequence. A supply accumulator upstream from the storage cell system is operable to accumulate bases during those periods when gate 52 is closed.

In general, the various conveying systems by means of which the articles are transported throughout their path of travel from injection molding machines 40 to the discharge end of assembly chute 70 transport the articles in single line and in a layer only one article in thickness. At some locations, such as the loading conveyors, two or more parallel lines may be employed or alternatively as on unloading conveyor 62, several articles may be conveyed in side by side relationship. At all cases, however, the bases are maintained in a single layer so that a positive orientation of the base is achieved throughout its path of travel. In accumulators 48 and 66, as in the individual cells 56, bases are stored in side by side relationship, but the single layer arrangement is retained.

While one embodiment of the invention has been disclosed, it will be apparent to those skilled in the art that the embodiment described may be modified. Therefore, the foregoing description is to be considered exemplary rather than limiting, and the true scope of the invention is that defined in the following claims.

We claim:

1. The method of supplying articles on demand to a production line work station wherein a normal substantially constant rate of demand for articles at said work station is subject to variation or temporary interruptions for random and unpredictable lengths of time comprising the steps of:

manufacturing said articles at a rate approximating said normal rate of demand, continuously feeding the articles as manufactured to a supply accumulator operable to receive and store up to a predetermined number of said articles, successively transferring articles in unit groups from said supply accumulator to individual ones of a group of like storage cells each having the capacity to receive and store a unit group of articles, intermittently emptying said cells sequentially, and transferring the articles emptied from said cells to a demand accumulator to store at least a minimum number of articles in said demand accumulator at all times, and transferring the articles from said demand accumulator to said work station on demand for articles at said work station.

2. The method of claim 1 further comprising the steps of maintaining the articles in a desired orientation by confining movement of said articles to a flow path having one dimension normal to the direction of movement of the articles only slightly exceeding one major dimension of said articles to thereby maintain said one major dimension of said articles normal to the direction of movement at all times.

3. The method of claim 2 further comprising the step of storing the articles in said accumulators and said cells in a vertical layer having a thickness of said one major dimension and a width and height respectively corresponding to multiples of other major dimensions of said articles.

4. The method of claim 3 further comprising the steps of gravitationally feeding the articles into and out of said accumulators and said cells.

5. The method of claim 4 wherein said cells are located in an aligned bank and the step of feeding said articles into said cells comprises the steps of transferring articles in line from said supply accumulator along a first path extending transversely above said bank of cells, diverting articles from said first path at a selected one of a plurality of locations on said first path, each of said plurality of locations being operatively aligned with one of said cells to cause articles diverted at a given one of said locations to drop into the cell operatively aligned therewith, and continuing to divert articles from said first path at said selected one of said plurality of locations until the cell aligned with the selected location is filled with articles.

6. The method defined in claim 5 further comprising the steps of diverting said articles from said first path by means of a chute moveable along said first path to said locations, maintaining an inventory of those cells which are empty, and selecting the next cell to be filled as that empty cell which requires the least amount of movement of said chute.

7. The method defined in claim 1 further comprising the steps of periodically inspecting an article at an inspection station upstream of said storage cells to determine if the article inspected is satisfactory or unsatisfactory, maintaining an inspect inventory of those cells into which articles passing said inspection station between successive inspections are transferred, and removing from the selected sequence of cells to be emptied those cells in said inspect inventory upon the inspection of an unsatisfactory article.

8. The method defined in claim 1 further comprising the steps of alternatively directing the flow of articles during the manufacturing step through either of a first or second decorating station respectively operable to apply a first or a second decoration to articles passing therethrough, regulating the flow of articles to said cells in accordance with the decoration applied to the articles so that each filled cell contains only articles having one type of decoration, maintaining a first inventory of those cells filled with articles having said first decoration, maintaining a second inventory of those cells filled with articles having said second decoration, and confining the selection of cells to be emptied to a selected one of said first and second inventories.

9. The method defined in claim 1 further comprising the step of transferring the articles from said cells to said demand accumulator at a rate dependent upon the number of articles stored in said demand accumulator.

10. A storage system for supplying articles to a production line on demand comprising a plurality of storage cells grouped together in side by side relationship, each of said cells being adapted to receive, store and discharge articles in a preselected orientation, cell leading means operable to feed oriented articles into a selected first empty storage cell until the cell is filled, first control means operable upon the filling of said selected first cell for shifting said cell loading means to a selected second empty cell for subsequent loading of articles into said second empty cell, cell unloading means operable to empty all articles from a selected first filled storage cell, second control means operable upon the emptying of all articles from said selected first filled cell for shifting said cell unloading means to a selected second filled storage cell for subsequent unloading of said second filled cell, transfer means for receiving articles from said cell unloading means and transferring the received articles to said production line in accordance with the demand for articles at said production line, and control means operable by said transfer means for controlling operation of said cell unloading means.

11. A storage system as defined in claim 10 wherein each of said cells comprises a pair of parallel vertically disposed partitions spaced from each other by a distance corresponding to one major dimension of the article to receive and store the articles with said one major dimension of each article oriented in a dimension normal to said partitions, upper, lower and opposite sidewall means extending between said partitions to define an article receiving and retaining chamber therebetween, article inlet means in the upper wall of said chamber for receiving oriented articles from said cell loading means, gate means in said lower wall normally closed to retain articles in said chamber, and gate opening means on said cell unloading means operable to open the gate means of a selected filled cell to permit articles to be discharged from the cell.

12. A system as defined in claim 11 wherein said lower wall is substantially horizontal further comprising flipper means extending along said lower wall between said sidewalls and said gate means normally maintained in a horizontal position flush with said lower wall, and means on said cell unloading means for shifting said flipper means into an active position wherein said flipper means are elevated relative to said lower wall and inclined downwardly toward said gate means after a predetermined number of articles have been gravitationally discharged from the cell upon opening of the gate means to facilitate the discharge of the remaining articles from the cell.

13. A system as defined in claim 10 wherein said transfer means comprises an article accumulator, first conveying means for conveying articles from said cell unloading means to said accumulator, second conveying means for conveying articles from said accumulator to said production line, and means responsive to the number of articles in said accumulator for actuating said control means and controlling the operation of said first conveying means.

14. A system as defined in claim 10 further comprising supply means operable to manufacture said articles and to discharge the articles in an oriented position at a selected constant rate, a supply accumulator for receiving articles from said supply means and accumulating the received articles in an oriented condition, and conveying means for conveying articles from said supply accumulator to said cell loading means.

15. A system as defined in claim 10 wherein said cell unloading means comprises a loading carriage mounted for movement along a path extending transversely above said cells normal to said partitions, positioning means operable to shift said loading carriage along said path into operative relationship with any selected one of said cells, and cell selection means including memory means maintaining an inventory of which of said cells are empty for selecting the next cell to be filled and operating said positioning means to shift said loading carriage into operative relationship with said next cell.

16. A system as defined in claim 15 further comprising manufacturing means for manufacturing said articles and discharging the manufactured articles in an oriented position at a substantially constant selected rate, a supply accumulator for receiving and accumulating oriented articles from said manufacturing means, conveying means for conveying articles from said supply accumulator to said cell loading means, gate means in said conveying means moveable between an open position accommodating flow of articles from said conveying means to said loading means and a closed position blocking flow of articles to said cell loading means, and means for shifting said gate means to said closed position during movement of said loading carriage.

17. In an article storage system having a plurality of like article storage cells grouped together in a side by side arranged bank; loading means for loading articles into said cells comprising conveying means for conveying articles in line along a first path extending transversely across and above said bank of cells from one end of said bank of cells to the opposite end thereof, a loading carriage mounted above said cells for movement parallel to said first path, a chute mounted on said loading carriage for movement therewith and having an article receiving inlet opening maintained in said first path, said chute diverging from said inlet opening to one side of said conveying means and thence downwardly to an article discharge opening, positioning means for locating said carriage at selected positions along its path whereat said article discharge opening is in alignment with a selected one of said cells to divert the flow of articles from said first path into said selected ones of said cells, and gate means at said one end of said bank of cells for stopping the flow of articles along said first path during operation of said positioning means.

18. In an article storage system as defined in claim 17; the further improvement comprising stationary guide means extending above and along that side of said conveying means opposite said one side to maintain articles on said first path, and extensible article guide means extending along said one side of said conveying means from said one end of said bank of cells to said inlet opening of said chute.

19. In an article storage system as defined in claim 17; the further improvement comprising counting means located adjacent said conveying means for counting articles passing into said selected cell, and means operable by said counting means for closing said gate means to discontinue the flow of articles into said selected cell after a predetermined number of articles have been loaded into said selected cell.

20. In an article storage system as defined in claim 17; the further improvement comprising means for continuously manufacturing and supplying articles at a substantially constant rate to a first location, an article accumulator for receiving and temporarily storing said articles at said first location, and transfer means for transferring articles in an oriented position from said accumulator to said conveying means.

21. In an article storage system; an article storage cell assembly having a plurality of like cells in side by side relationship, each cell comprising a pair of like partitions mounted in opposed parallel relationship to each other to define opposed vertical walls of said cell spaced from each other by a distance slightly exceeding one major dimension of the articles to be stored therein, means extending between said partitions to define opposite side walls of said cell, an upper wall extending between said partitions having at least one article inlet opening therethrough to accommodate the passage of articles into said cell with said major dimension of the article normal to said partitions, a lower wall extending between said partitions and having an article discharge opening therethrough accommodating the passage of articles from said cell with said major dimension of the article normal to said partitions, retractible gate means normally closing said discharge opening to permit the filling of said cell with a plurality of articles stacked in a vertically disposed layer one article in thickness with said major dimension of each article normal to said partitions, gate actuating means for retracting said gate means clear of said discharge opening to permit the gravitational discharge of articles from said cell, first conveying means extending above said cell assembly for feeding articles to the inlet openings of said cells, cell unloading means moveable beneath said cell assembly into alignment with a selected cell and operable when aligned with a selected cell to control operation of the gate actuating means of the cell aligned therewith.

22. An article storage cell as defined in claim 21 wherein said discharge opening is located centrally of said lower wall and further comprising a flipper bar mounted at each side of said discharge opening for pivotal movement about an axis normal to said partitions, each flipper bar extending from said discharge opening to the adjacent side wall of said cells, and flipper bar operating means operable subsequent to the retracting of said gate means for pivoting said flipper bars upwardly about their respective axes to assist in gravitationally discharging articles from said cells.

23. In an article storage system as defined in claim 22 said cell unloading means comprising an unloading carriage mounted for movement along a path extending beneath said cells in a direction normal to said partitions, means mounting said flipper bar operating means on said carriage for movement therewith, and carriage drive means for positioning said carriage beneath a selected one of said cells.

24. In an article storage system as defined in claim 23; the further improvement comprising conveying means having an article receiving run extending beneath said carriage in parallel relationship to the path of movement of said carriage, chute means mounted on said carriage having an article receiving opening located to be in vertical alignment with the article discharge opening of said selected one of said cells, said chute having an article outlet opening at its opposite end for discharging articles onto said article receiving run of said conveying means with said major dimension of the articles normal to the direction of movement of said article receiving run.

25. An article storage system comprising a plurality of like article storage cells arranged in a side by side bank, each of said cells having an article receiving opening at the top of the cell, the article receiving openings in the respective cells being aligned with each other in a row, an article infeed conveyor extending across and above said bank in parallel relationship to said row of openings for conveying articles above said bank of cells, feeding means for feeding articles onto the inlet end of said infeed conveyor, gate means at the inlet end of said infeed conveyor, gate control means operable to selectively position said gate means in an open or in a closed position wherein said gate means respectively permits or blocks the movement of articles from said feeding means onto said infeed conveyor, article diverting means moveable along said conveying means into alignment with the article receiving opening of a cell to transfer articles conveyed on said conveying means into said cell, positioning means actuable to shift said diverting means into alignment with the opening of a selected one of said cells, first control means actuable in response to the filling of a first cell to a predetermined extent with articles for closing said gate means, second control means operable to predetermined time after actuation of said first control means for actuating said positioning means to shift said diverting means into alignment with a second empty cell, and third control means operable in response to the alignment of said diverting means with said second cell for opening said gate means.

26. A system as defined in claim 25 further comprising means responsive to the jamming of articles in movement between said gate means and the cell receiving opening for stopping operation of said conveying means.

27. A system as defined in claim 25 wherein said second control means includes detecting means for detecting the presence or absence of articles in said diverting means, and fourth control means operable by said detecting means for preventing actuation of said positioning means upon the presence of an article in said diverting means after a predetermined time interval subsequent to the closing of said gate means.

28. A system as defined in claim 25 wherein said first control means comprises a counter for maintaining a count of articles fed to said cell and operable to generate a signal upon the counting of a predetermined number of articles, level sensing means adjacent the inlet opening of said cell operable to generate a signal, and signal receiving means responsive to a signal generated by either of said counter and said level sensing means for closing said gate means.

29. Article storage means comprising a plurality of like article storage cells arranged in a side by side bank, each of said cells having an article discharge opening at the bottom of the cell, the discharge openings in the respective cells being aligned with each other in a row gate means on each cell normally closing the cell discharge opening and moveable to an open position to permit the discharge of articles from the cell, conveying means extending beneath said bank of cells in underlying relationship to said row of discharge openings for conveying articles from said bank of cells, an unloading carriage moveable beneath said cells between said openings and said conveying means and operable when aligned with a cell discharge openings to conduct articles from the cell onto said conveying means, positioning means actuable to move said carriage into alignment with the discharge opening of a cell, first control means responsive to the alignment of said carriage with the discharge opening of a first cell for opening the gate means of said first cell, second control means responsive to the emptying of said first cell for closing said gate means, and third control means responsive to the closing of said gate means for actuating said positioning means to shift said carriage to a selected filled second cell.

30. A system as defined in claim 29 further comprising flipper bar means on the bottom of each cell adjacent the discharge opening moveable from a normally maintained inactive position on the cell bottom to an active position wherein said bar means incline downwardly toward said opening to assist in gravitationally discharging articles from the cell, counting means for maintaining a count of articles discharged from the cell, a bar actuating means on said carriage operable when said counting means reaches a preset count for shifting said flipper bar means to said active position, and means responsive to the closing of said gate means for restoring said flipper bar means to said inactive position.

31. A system as defined in claim 29 further comprising demand accumulator means for receiving articles from said conveying means and for discharging articles at a randomly variable rate, said accumulator being operable to store and accumulate a supply of articles to compensate for fluctuations in the rate at which articles are discharged therefrom, drive means for driving said conveying means at different rates of speed, and drive control means for controlling operation of said drive means in accordance with the number of articles accumulated in said accumulator.

32. A system as defined in claim 31 wherein said drive control means includes means for stopping said conveying means when said accumulator is substantially filled with articles.

33. A system as defined in claim 32 wherein said carriage comprises a chute defining a confined gravitational flow path for articles from the discharge opening onto the surface of said conveying means, stoppage of said conveying means, by said drive control means during emptying of a cell causing articles on said conveying means to block the flow of articles from said chute.

34. A system as defined in claim 33 further comprising means in said third control means for preventing actuation of said positioning means until said conveying means is cleared of articles.

* * * * *

UNITED STATES PATENT OFFICE
CERTIFICATE OF CORRECTION

Patent No. 3,727,756   Dated April 17, 1973

Inventor(s) Joseph S. Koluch and Ralph E. Wittman

It is certified that error appears in the above-identified patent and that said Letters Patent are hereby corrected as shown below:

Col. 11, line 26, "17CRa" should be --11CRa--

Col. 13, line 5, "openings" should be --opening--

Col. 31, line 2, "form" should be --from-- line 3, "maintained" should be --maintain--

CLAIM 15 - Col. 35, line 48, after "means" insert --for--

CLAIM 10 - Col. 34, line 42, "leading" should be --loading--

Signed and sealed this 5th day of February 1974.

(SEAL)
Attest:

EDWARD M. FLETCHER, JR.
Attesting Officer

RENE D. TEGTMEYER
Acting Commissioner of Patents